United States Patent [19]
Teicher et al.

[11] Patent Number: 5,933,813
[45] Date of Patent: Aug. 3, 1999

[54] SALES PROMOTION DATA PROCESSOR SYSTEM AND INTERACTIVE CHANGEABLE DISPLAY PARTICULARLY USEFUL THEREIN

[75] Inventors: Mordechai Teicher, Kfar Saba; Avner Halperin, Tel Aviv, both of Israel

[73] Assignee: Eldat Communication Ltd., Bnei Brak, Israel

[21] Appl. No.: 08/632,576

[22] Filed: Apr. 15, 1996

[30] Foreign Application Priority Data

Apr. 13, 1995 [IL] Israel ........................................ 113352
Dec. 31, 1995 [IL] Israel ........................................ 116636

[51] Int. Cl.[6] .......................... G06K 15/02; G06K 15/00; G06K 7/10; B41F 17/00
[52] U.S. Cl. ............................... 705/26; 705/20; 705/22; 705/14; 705/16; 705/400; 705/23; 705/1; 705/17; 705/28; 235/383; 235/380; 235/375
[58] Field of Search .................................. 705/20, 22, 14, 705/23, 400, 16, 1, 10, 28, 17; 186/59, 61; 235/383, 380, 375

[56] References Cited

U.S. PATENT DOCUMENTS

| | | | |
|---|---|---|---|
| 3,688,087 | 8/1972 | Howard et al. | 235/383 |
| 3,908,800 | 9/1975 | Drapeau | 186/56 |
| 4,002,886 | 1/1977 | Sundelin | 235/383 |
| 4,084,742 | 4/1978 | Silverman | 235/383 |
| 4,139,149 | 2/1979 | Crepeau et al. | 235/383 |
| 4,346,453 | 8/1982 | Drapeau et al. | 705/28 |
| 4,503,503 | 3/1985 | Suzuki | 705/400 |
| 4,521,677 | 6/1985 | Sarwin | 235/385 |
| 4,649,481 | 3/1987 | Takahashi | 705/10 |
| 4,766,295 | 8/1988 | Davis et al. | 235/383 |
| 4,821,186 | 4/1989 | Munakata et al. | 705/14 |
| 4,841,442 | 6/1989 | Hosoyama | 705/20 |
| 4,855,908 | 8/1989 | Shimoda et al. | 705/20 |
| 4,882,724 | 11/1989 | Vela et al. | 705/16 X |
| 4,901,237 | 2/1990 | Hikita et al. | 705/28 X |
| 4,962,466 | 10/1990 | Revesz et al. | 705/14 |
| 5,019,811 | 5/1991 | Olsson et al. | 340/825.35 X |
| 5,053,957 | 10/1991 | Suzuki | 705/20 X |
| 5,250,789 | 10/1993 | Johnsen | 235/383 X |
| 5,256,863 | 10/1993 | Ferguson et al. | 705/14 X |
| 5,313,569 | 5/1994 | Olsson et al. | 345/418 |
| 5,388,165 | 2/1995 | Deaton et al. | 382/139 |
| 5,430,644 | 7/1995 | Deaton et al. | 705/14 |
| 5,493,107 | 2/1996 | Gupta et al. | 235/383 |
| 5,504,675 | 4/1996 | Cragun et al. | 705/14 |
| 5,537,312 | 7/1996 | Sekiguchi et al. | 235/383 X |
| 5,539,393 | 7/1996 | Barfod | 340/825.35 |
| 5,557,513 | 9/1996 | Frey et al. | 705/16 X |
| 5,632,010 | 5/1997 | Briechle et al. | 705/14 X |
| 5,642,279 | 6/1997 | Bloomberg et al. | 705/20 X |
| 5,646,616 | 7/1997 | Komatsu | 705/22 X |
| 5,729,697 | 3/1998 | Schkolnick et al. | 705/23 |
| 5,734,839 | 3/1998 | Enoki et al. | 705/20 |

Primary Examiner—Eric W. Stamber
Assistant Examiner—Pedro R. Kanof
Attorney, Agent, or Firm—Helfgott & Karas, P.C.

[57] ABSTRACT

A data processor system for promoting sales of products includes price storage devices for storing basic price information; criteria storage devices for storing predetermined criteria to be used in determining sales promotion prices; sensors for sensing the predetermined criteria; a data processor for receiving data from the above, and for automatically determining sales promotion prices of the products in accordance with the received data; and electronic displays controlled by the data processor for displaying the sales promotion prices. Also described is an interactive changeable display particularly useful in the sales promotion system, but also useful for other applications, such as for providing routing instructions to a plurality of destinations.

20 Claims, 19 Drawing Sheets

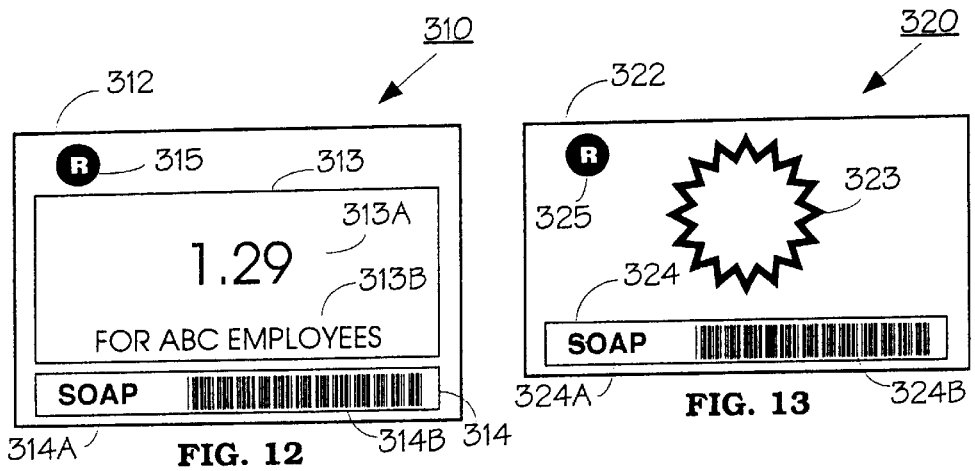
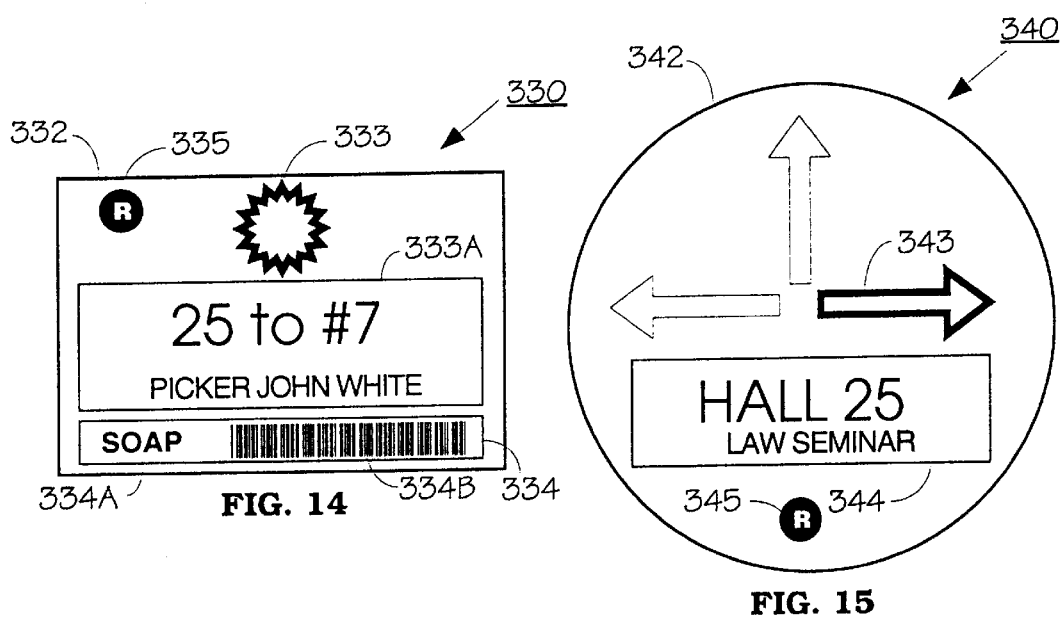
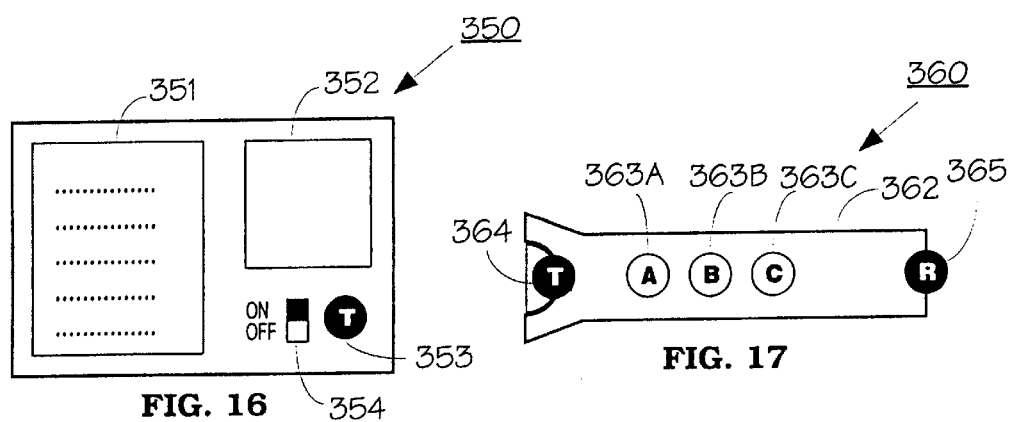

SALES PROMOTION DATA PROCESSOR SYSTEM AND INTERACTIVE CHANGEABLE DISPLAY PARTICULARLY USEFUL THEREIN

FIELD AND BACKGROUND OF THE INVENTION

The present invention relates to an automatic sales promotion data processor system, and in particular to such system to be located in a sales (e.g., retail) outlet to adjust prices dynamically and automatically according to predetermined criteria. The invention also relates to an interactive changeable display particularly, but not exclusively, useful in the sales promotion data processor system.

Sales promotion is a well-known retail technique for increasing revenues, attracting customers, encouraging purchase at certain hours, accelerating the sales of manufacture-promoted products, reducing the inventory of rapdily-ageing or slow-selling products, and the like. Sales promotion is commonly implemented by having a Sale, in which the prices of specified items, or specified item combinations, are temporarily reduced. However, for such a sale to be most effective, it must be properly and timely announced to the customers of the sales outlet.

OBJECTS AND BRIEF SUMMARY OF THE INVENTION

An object of the present invention is to provide a data processor system for use in promoting sales by automatically and dynamically adjusting prices according to predetermined criteria.

Another object of the invention is to provide an interactive changeable display particularly useful in the novel sales promotion system.

According to one aspect of the present invention, there is provided a data processor system particularly useful in a sales outlets for promoting the sales of products, comprising: price storage devices for storing basic price information relating to the products; criteria storage devices for storing predetermined criteria to be used in determining sales promotion prices of the products; criteria input means for inputting data concerning the predetermined criteria; a data processor for receiving data from the price storage devices, from the criteria storage devices, and from the criteria input means, and for automatically determining sales promotion prices of the products in accordance with the received data; and electronic displays controlled by the data processor for displaying the sales promotion prices with respect to the products.

According to further features in the preferred embodiments of the invention described below, the criteria input means includes sensors for sensing condition relating to the predetermined criteria. Such criteria may include sales volume of the respective products, or traffic volume in the sales outlet or section thereof, over a predetermined time interval, current inventory status of the respective products, and/or the category of the purchaser as identified by a portable unit carried by the respective purchaser.

According to further features in the described preferred embodiments, the electronic displays include electronic shelf labels, such as described for example in U.S. Pat. Nos. 4,002,886, 4,139,149, 4,521,677, 4,766,295, 5,019,811 and 5,313,569. Such electronic shelf labels may automatically and dynamically be changed according to predetermined criteria.

As indicated earlier, one of the predetermined criteria may be the category of the purchaser as identified by a portable unit carried by the respective purchaser. For example, the sales promotion technique may involve special price reductions for special purchaser categories, e.g., senior citizens, military personnel, members of special organizations, and the like. In such case, the purchaser would carry a portable unit including a transmitter for transmitting a coded signal identifying the respective category of the purchaser, which would interact with the electronic shelf label to display the special price for the category of purchaser.

Such an interactive changeable display could be used in other applications, for example for providing routing instructions directing a person carrying a portable unit to a specific destination identified by the portable unit.

According to another aspect of the present invention, therefore, there is provided an interactive changeable display system for use by a plurality of users of different categories, comprising: a plurality of portable units, one for each of at least some of the users, of a size to be carried by the user, each portable unit including a transmitter for transmitting a coded signal identifying the respective category of the user; a common display unit for a plurality of users, the display unit including a changeable display, and a receiver for receiving the coded signals transmitted by the portable units; and a central processor unit including a storage device for storing display data corresponding to the different categories of users to use the system, and an automatic selector circuit for selecting from the stored data the display data corresponding to the coded signals received by a respective display unit and for outputting the selected display data to the changeable display of the respective display unit for display therein.

Further features and advantages of the invention will be apparent from the description below.

BRIEF DESCRIPTION OF THE DRAWINGS

The invention is herein described, by way of example only, with reference to the accompanying drawings, wherein:

FIGS. 12–15 illustrate four other types of display units for use in interactive changeable display systems in accordance with the present invention;

FIGS. 16 and 17 illustrate two types of portable units for use in interactive changeable display systems in accordance with the present invention;

DESCRIPTION OF THE PREFERRED EMBODIMENTS

Figure 1:
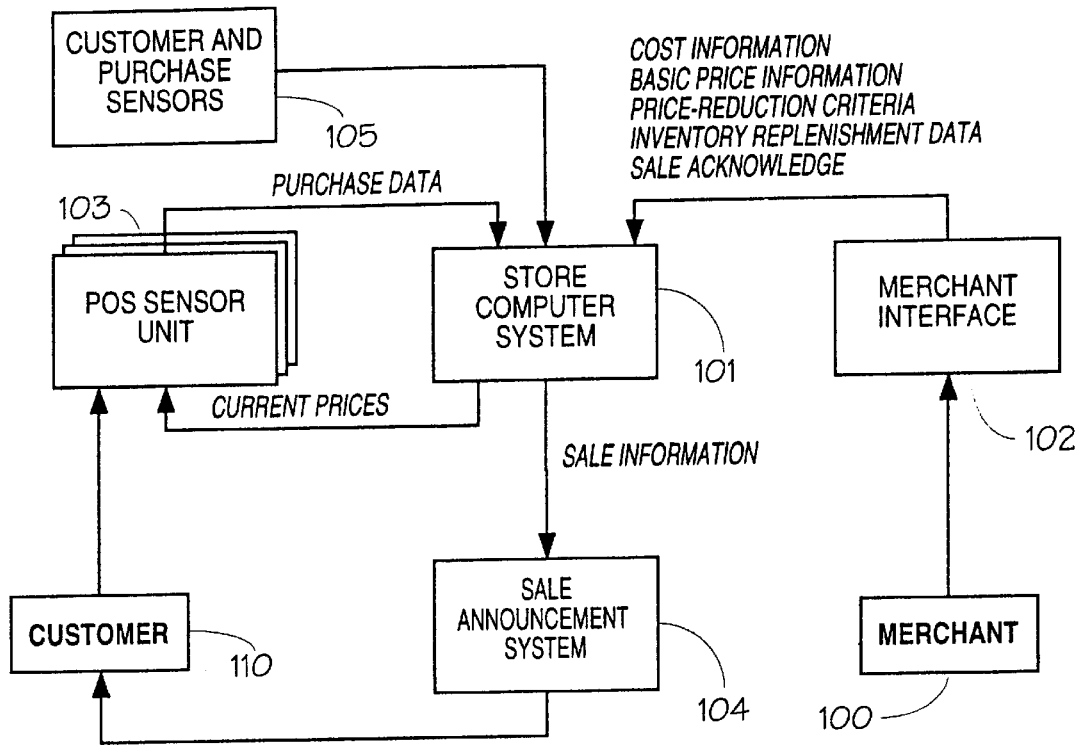
FIG. 1 is a general block diagram of an interactive sales promotion system in accordance with the present invention.

In the interactive sale promotion system illustrated in FIG. 1, a merchant 100 communicates with a store computer system 101, through a merchant interface 102 which can be, for example, a keyboard and screen, or, alternatively, an interface with another local or remote computer maintained by the merchant. The merchant interface 102 provides the store computer system 101 with cost information regarding the various products offered for sale by the store, and basic price information regarding the normal price for such merchandise items. The foregoing cost information and price information is stored in storage devices in the computer system 101.

The computer system 101 also includes predetermined criteria storage devices for storing predetermined criteria to be used in determining sales promotion prices of the products offered for sale. Such predetermined criteria may include sales volume of products individually, or in specified combinations, over predetermined time intervals; traffic volume through the store, or specifified sections of the store, over predetermined time intervals; and/or the current inventory status of the respective products being offered for sale. As will be described below, the system further includes sensor means for sensing the foregoing predetermined criteria, and for feeding this information into a data processor within the computer system 101. The data processor also receives data from the price storage devices, the cost storage devices, and the predetermined criteria storage devices, with the data from the sensors sensing the predetermined criteria, and automatically determines sales promotion prices of the products in accordance with such received data. Such sales promotion prices are displayed in electronic displays also controlled by the data processor in the computer system 101.

The store computer system 101 communicates with one or more points of sale (POS) sensor units 103 which sense each product presented at the respective POS unit and generate purchase data identifying the sold products. The purchase data is used for both (1) determining the momentary purchase pattern and for (2) updating the inventory information stored at the computer. The store computer system 101 uses the information stored therein, as will be described in detail below, to generate a list of price reductions. This list updates the current prices charged at the POS unit 103, and is announced to the customer as sale information through the sale announcement system 104.

Figure 2A:
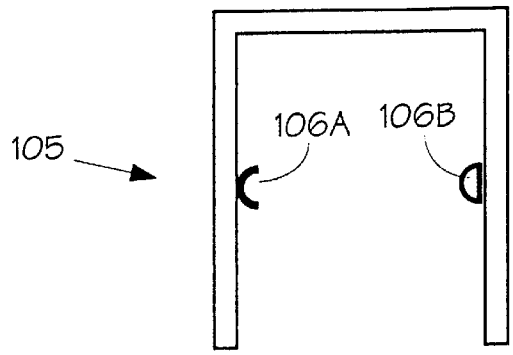
FIGS. 2A, 2B and 2C schematically illustrate three arrangements for sensing traffic volume in the sale outlet.
Figure 2B:
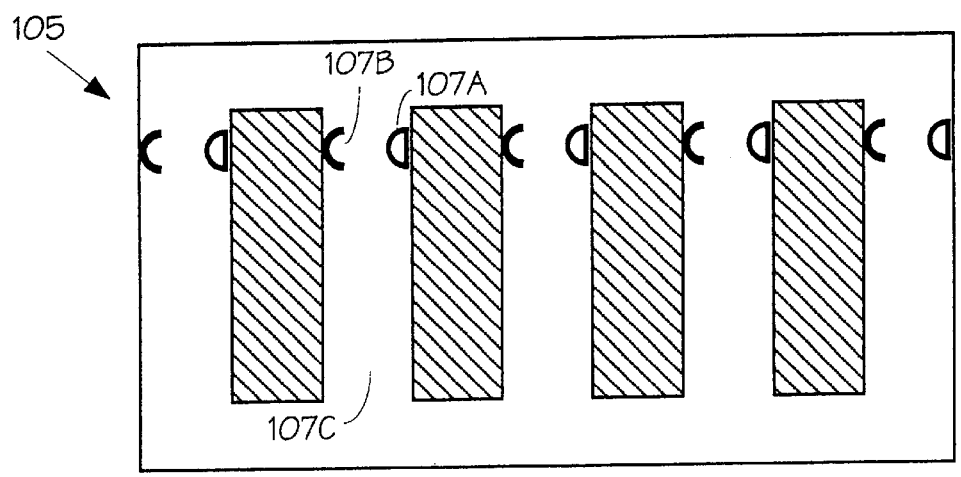
Figure 2C:
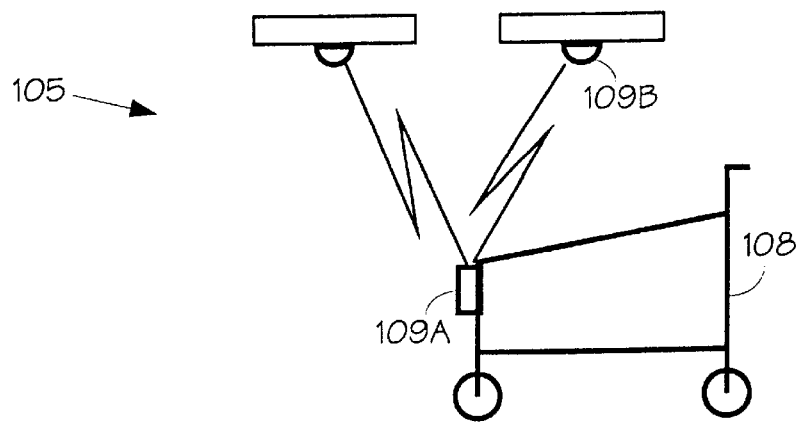

The illustrated system includes other sensors, generally designated 105, for sensing other criteria that may be taken into account in generating the list of price reductions. Thus, FIG. 2A illustrates an optical sensor, including a light source 106B and a light detector 106B, across the main doorway of the store for sensing the traffic entering and/or leaving the store. FIG. 2B illustrates sensors, including a light source 107A and a light detector 107B, for sensing the traffic through selected aisles 107C of the store. and FIG. 2C illustrates an arrangement for the location of the carts 108 in the store. The latter arrangement includes a transponder 109A on each cart 108, which automatically triggered by transmitter/receiver units 109B, e.g., mounted in the store ceiling, to transmit to the receiver of units 109B a code signal identifying the respective cart, and thereby enabling the system to keep track of the locations of all the carts.

With reference back to FIG. 1, the customer 110 interfaces with the sale announcement system 104 to receive the sale information, and also with the POS sensor unit 103 when the customer purchases a particular product. The sensors 105, when applied at the entrance of the store as shown in FIG. 2A, sense the volume of customers entering the store, whereas the aisle sensors illustrated in FIG. 2B sense the traffic through the aisles. The information generated by these sensors is fed to the store computer system 101 for use in automatically determining, and readjusting if necessary, the sales promotion prices of the product in accordance with these criteria.

Figure 1A:
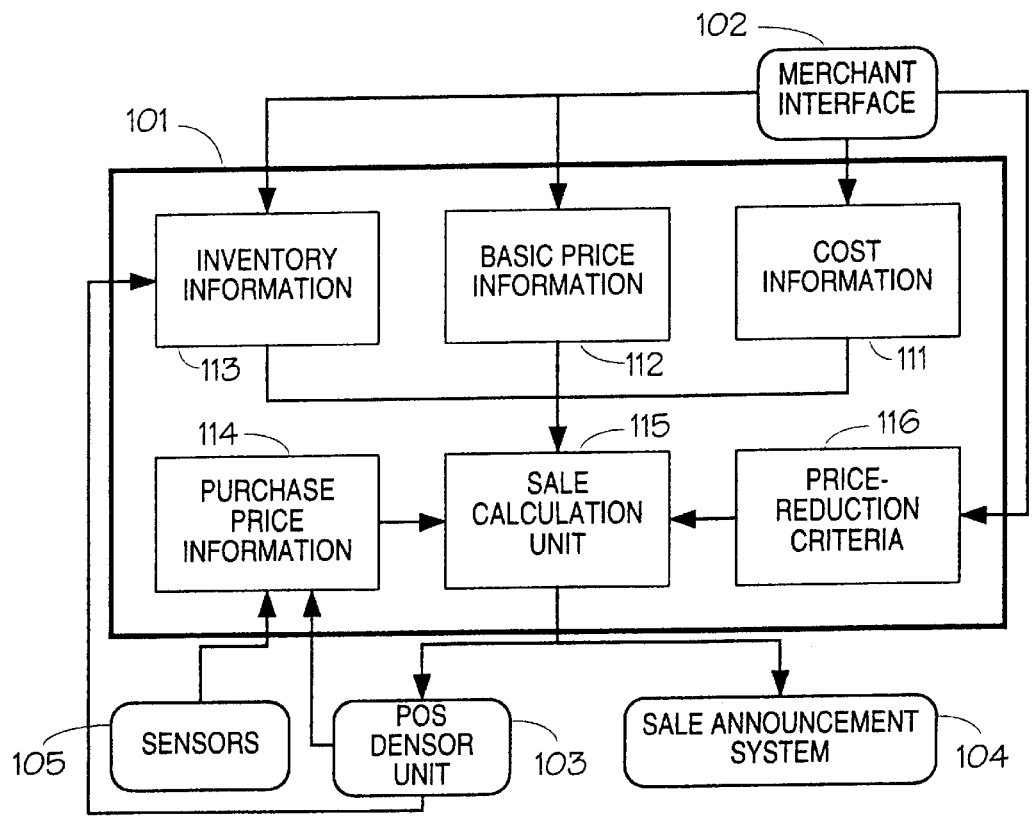
FIG. 1A is a block diagram of the store computer system in the sales promotion system of FIG. 1.

FIG. 1A is a block diagram, describing in detail the store computer system, which may include one computer or several linked computers. The store computer system 101 stores cost information 111 as entered by the merchant through the merchant interface 102, and basic price information 112, determined by the merchant for each product according to calculations and considerations made separately. The basic price information determines the price for an item when the present invention is not activated to reduce its price. The inventory information 113 is calculated from purchase information received from the POS sensor unit 103, and inventory replenishment information received through the merchant interface 102. Interface 102 may also be used by the merchant to acknowledge a sale.

Purchase price information 114, is calculated from the purchase data received from the POS sensor unit 103 and/or from sensors 105, and includes data such as number of sales, units sold of each merchandise item, and dollars collected each minute. This data is used for calculating short-term statistics, used by the Sale calculation unit 115 to determine short-term price-reductions according to the stored price-reduction criteria 116. The short-term price-reduction is announced as a sale through the sale announcement system 104.

Table 1 below illustrates an example of an item record in an integrated item database, which comprises item identification information, as well as item-related information regarding the information blocks 111, 112, 113, 114, 116 of FIG. 1A:

TABLE 1

INTEGRATED ITEM DATABASE

| | |
|---|---|
| ITEM NO.: | 123456789 |
| DESCRIPTION: | ACE SHAVING CREAM |
| GROUPS: | BODYCARE; MEN'S; DRUGSTORE |
| BASIC PRICE: | 1.99/UNIT |
| COST: | 1.20/UNIT |
| IN INVENTORY: | 320 UNITS |
| FULL INVENTORY: | 600 UNITS |
| PRICE REDUCTION: | REDUCE 25% OF PROFIT/STEP |
| NORMAL SALES: | 7 UNITS/1000 CUSTOMERS |
| CURRENT AVERAGE SALES: | 4 UNITS/1000 CUSTOMERS |
| PRESENT SALE STATUS: | 1 STEP |

"ITEM" identifies the product in a machine-read manner, e.g., by a POS bar-code reader, or by an electronic shelf label address. "DESCRIPTION" identifies the product in a human recognition manner, e.g., by item stickers or by Sale announcements. "GROUPS" allows identifying categories for Sales or for allowed combinations in Sales. "BASIC PRICE" is the price charged for the respective item if its price is not to be reduced; it is determined separately by the merchant, and may include preliminary price reduction, for instance, under seasonal or manufacturer-promoted Sales. "COST" is included to allow profit calculation, if profit-reduction criteria are used to calculate reduced prices. "IN INVENTORY" refers to the quantity currently in inventory and is continuously updated by inventory replenishment information provided by the merchant through the merchant interface, and by inventory consumption information received from the POS unit. It is used for inventory-related price reduction criteria, when compared to the "FULL INVENTORY" data. The "PRICE REDUCTION" specifies how the price reduction is effected; in this case it is effected by a specified number of steps with each step specifying a reduction in the profit to calculate the new price. "NORMAL SALES" is a parameter related to long-term sales statistics and is used to determine which items are currently slow-selling, when compared to the "CURRENT AVERAGE SALES". "PRESENT SALE STATUS" is a parameter set by the computer to zero is there if no Sale then in effect on the specified item, or set to the number of price reduction steps currently in effect.

Table 2 illustrates an example of price reduction criteria 116 of FIG. 1A, which is prescribed by the merchant, stored in the computer, and used to determine the correlation between purchase pattern and price reduction. It includes general price reduction criteria, while item-specific price-reduction criteria is included in Table 1.

TABLE 2

PRICE REDUCTION CRITERIA

| | |
|---|---|
| GENERAL | |
| SHORT-TERM AVERAGING: LOW-TRAFFIC | ON THE LAST 2 HOURS |
| GLOBAL PRICE REDUCTION BY 1 STEP: | UNDER 50 CUSTOMER/HOUR OR UNDER $2500/HOUR |
| GLOBAL PRICE REDUCTION BY 2 STEPS: | UNDER 30 CUSTOMERS/HOUR OR UNDER $1500/HOUR |
| SLOW-SELLING ITEMS | |
| PRICE REDUCTION BY 1 STEP: | AVERAGE SALES <50% OF NORMAL UNLESS INVENTORY <30% OF FULL |
| PRICE REDUCTION RE-ADJUSTMENT | |
| INCREASE PRICE REDUCTION BY 1 STEP: | IF AVERAGE SALES INCREASE <50% |
| ALLOWED COMBINATIONS | |
| ALLOWED GROUP COMBINATIONS: | {DAIRY-DAIRY}; {DRUGSTORE-STATIONERY} |
| ALLOWED ITEM COMBINATIONS: | {SHAVING CREAM-TOOTHPASTE} |
| PREFER COMBINATIONS? | YES |

"SHORT-TIME AVERAGING TIME" determines the time used for averaging short-term purchase statistics. In this example, criteria may be stored specifying the condition for 1-step and 2-step price reductions, respectively. The price reduction criteria may also specify the condition for price reduction of a slow-selling item, according to its specific parameters defined in Table 1. The price reduction criteria may also include the effect of the price reduction on the sale increase, for deciding whether and when the price should be further reduced, if the sales-increase expectations are not met.

The price reduction criteria may also allow creating combination price reductions on items from specified categories in correspondence to the category specification in Table 1. The price reduction criteria may also specify whether an item combination, e.g., for slow-selling items, over individual item price reduction.

Figure 1B:
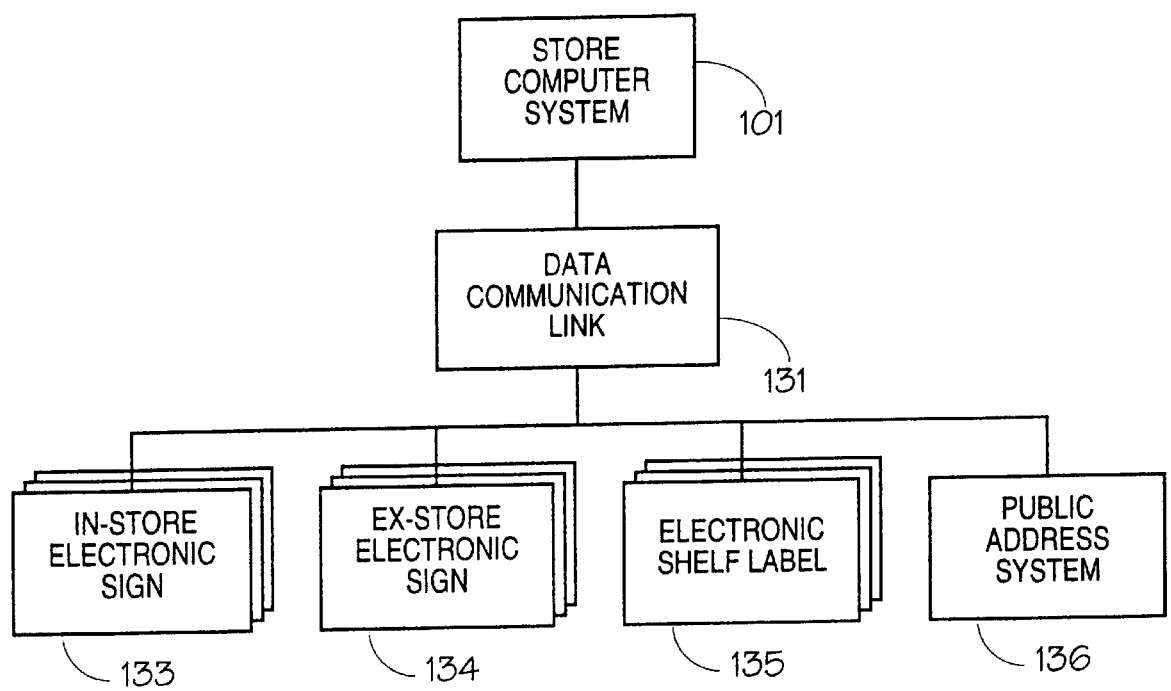
FIG. 1B is a block diagram of the sale announcement system in the sales promotion system of FIG. 1.

FIG. 1B is a block diagram of the Sale announcement system. The store computer system 101 uses a data communication medium 131 to send messages to announcement means 133–135. The data communication medium 131 can be a hard wired network, or use electromagnet radiation in the range of radio frequency or infrared for wireless communication. The in-store electronic signs 133 and electronic shelf labels 135 provide general sale information relating to identifying items, item combinations, or item categories currently on sale. The ex-store signs 134 are located at the store windows, walls, roof, etc., to attract customers to the store by presenting the current prices with respect to each type of item, and optionally notifying whether the item is currently on sale. The optional public address system 136 sends vocal sale messages, for example by displaying written sale messaages on a screen to a human announcer who speaks into a microphone of a conventional public address system, or through an automatic public address system which uses pre-recorded or synthesized phrases for the announcements.

Figure 3:
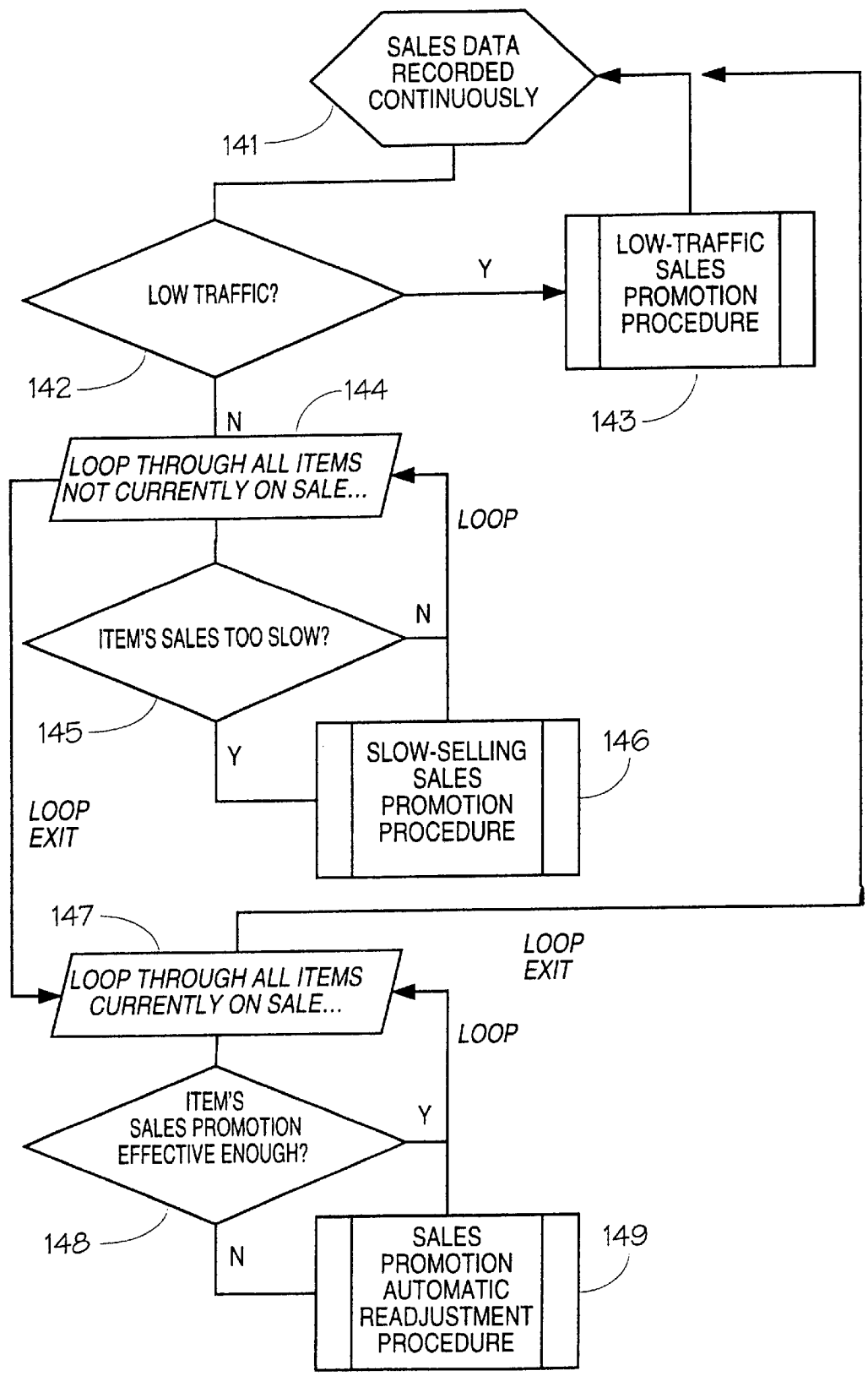
FIG. 3 is a flow chart of the main procedure for price-reduction calculation.

FIG. 3 is a flow chart that illustrates an example of the operation of the Sale calculation unit 115 of FIG. 1A, which is the heart of the present invention. Block 141 represents the continuous collection of purchase data through the POS sensor unit 103 and/or sensors 105, accumulated as purchase pattern information 114 at the store computer system. The purchase pattern is analysed by block 142, in light of the price-reduction criteria 116, to find out whether a low-traffic situation is present, e.g., as specified in Table 2. If a low-traffic situation is in effect, then the low-traffic sales promotion procedure 143 is executed, as will be described in detail in FIG. 4 below.

If no low-traffic situation is detected by block 142, then the Sale calculation unit 115 loops via loop 144 through all items which are not currently on sale by a previous iteration of the present procedure, to identify items whose present sales are lower than a threshold specified by the price-reduction criteria 116, e.g., slow-selling items per Table 2 (block 145). Such items are put on sale as individual items or item combinations through procedure 146, described in detail in FIGS. 5–6 below.

Items which are currently on sale by the present procedure are checked by loop 147 to find out whether their sales increase is effective enough according to predefined expectations included in the price-reduction criteria 116. For example, sales of a slow-selling item which has been put on sale are checked, to find out whether the average under-sale sales per customer have been increased as specified in Table 2. If not, procedure 149 is activated to further reduce the item's price, as described in detail in FIG. 7 below.

Additional information may be taken into account for identifying sales promotion conditions not shown in FIG. 3, such as, for example, inventory information 113 (FIG. 1A), calculated from inventory replenishment information inputted by the merchant and inventory consumption information received from the POS unit 103. Inventory of fast-aging items which exceed a specified threshold at a certain hour may be the cause for a special sale, while low inventory may cancel or discontinue an item's sale which may be otherwise desirous, as shown in the example in Table 2.

Figure 4:
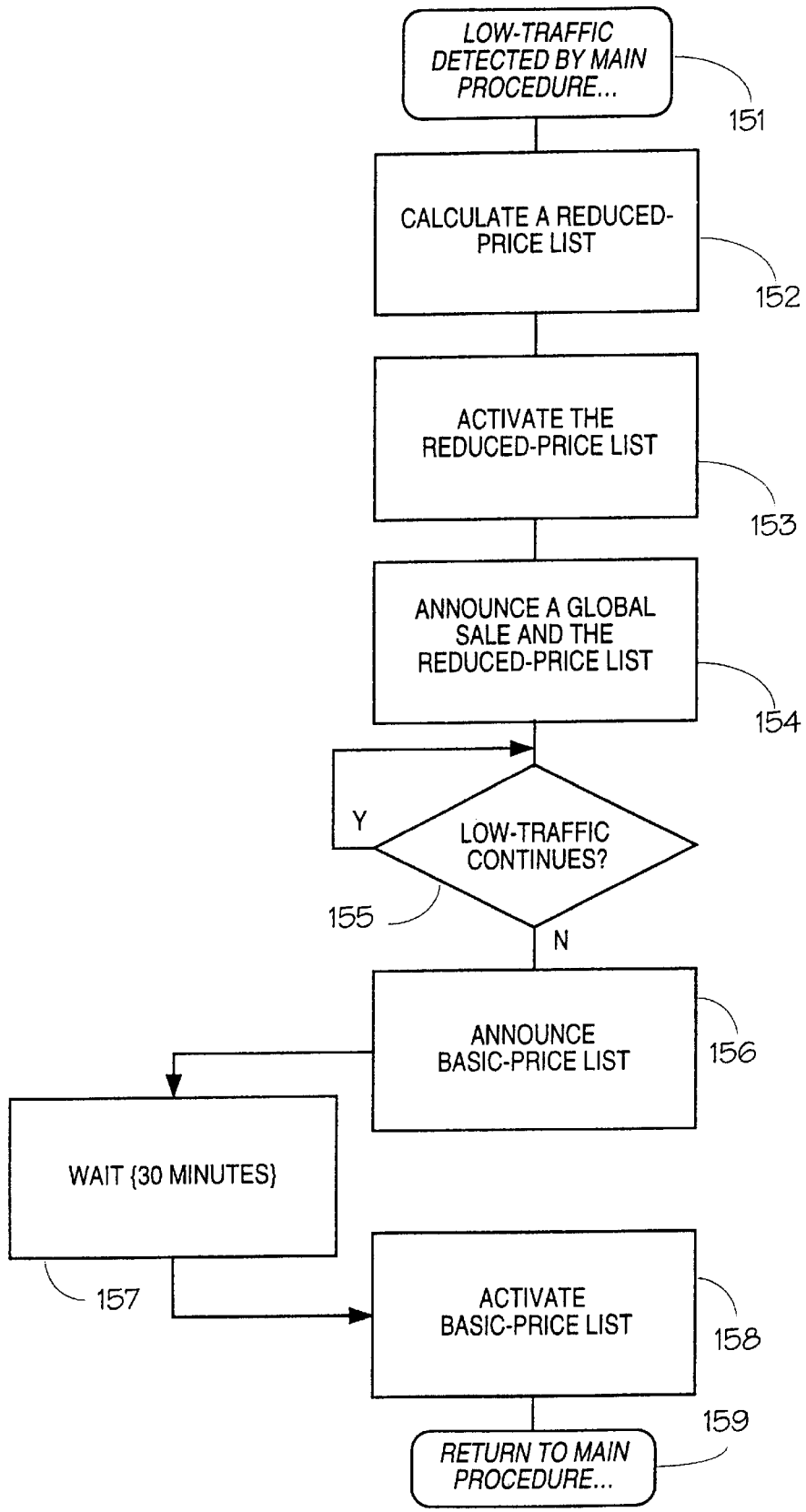
FIG. 4 is a flow chart of a sale promotion procedure in a low-traffic situation.

FIG. 4 starts at 151 as a low-traffic situation, defined by the price reduction criteria 116 which is detected by block 142 of the main procedure of FIG. 3. In this example, the price of all items is reduced so that the profit margin, which is the difference between the item's basic price and the item's cost, stored in blocks 112 and 113 of FIG. 1A, is cut by one or two steps, as determined in accordance with the criteria of Table 2. After the reduced price list is calculated at 152, it is activated at 153, which makes all POS units charge the new, reduced price. Block 154 announces the global sale and the reduced prices throughout the store through the Sale announcement system 136 of FIG. 1B. The sale is maintained as long as the low-traffic status is in effect, as described by block 155. When the low-traffic situation ends, the basic list is announced by the Sale announcement system of FIG. 1 or FIG. 1B. However, as there are customers in the store who have purchased items under the reduced price list, a delay of, say, 30 minutes is maintained by block 157, until the basic price list is actually activated at the POS unit 103 by block 156, following which the system returns to the Main Procedure (block 159).

Figure 5:
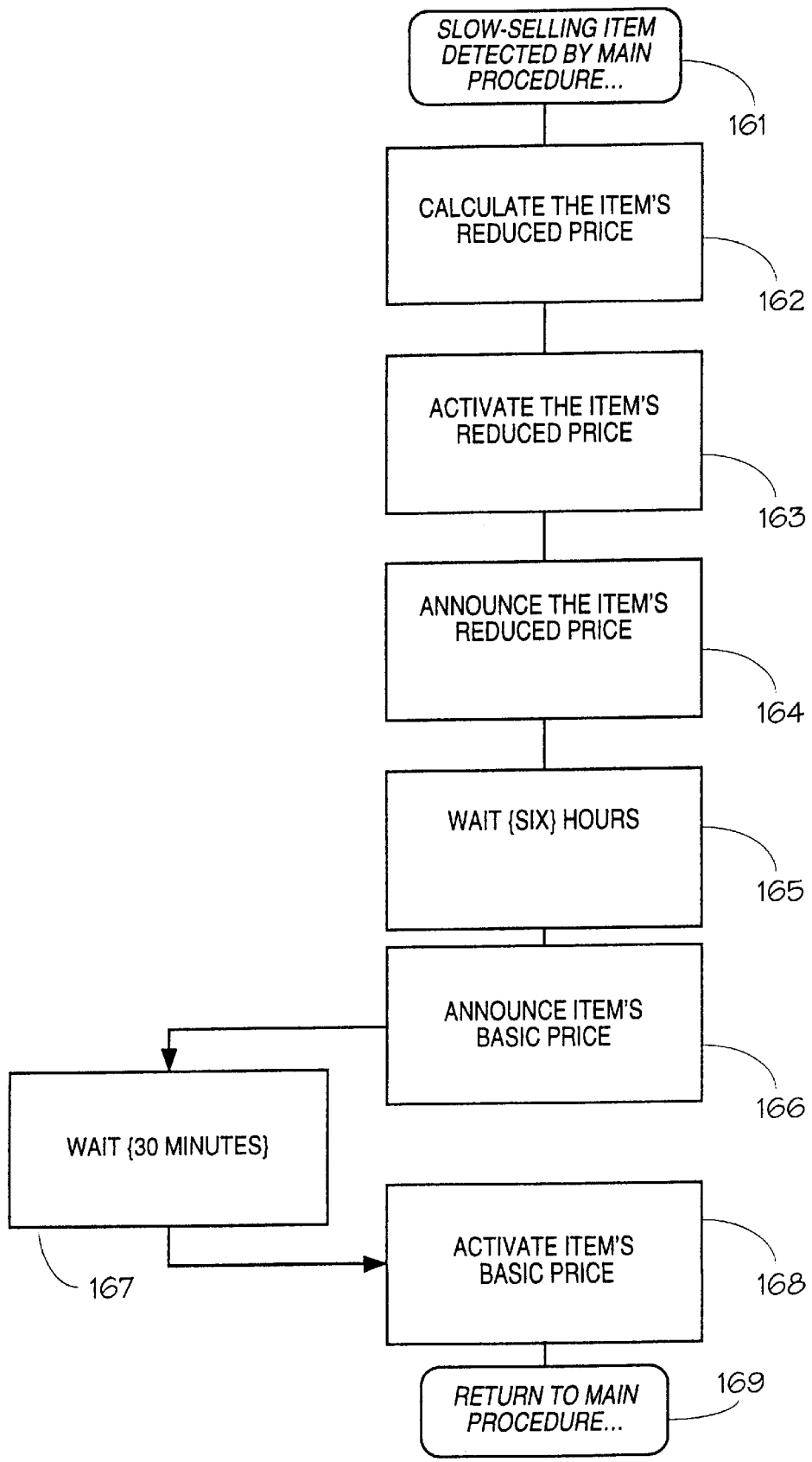
FIG. 5 is a flow chart of a sale promotion procedure for a slow-selling item.
Figure 6:
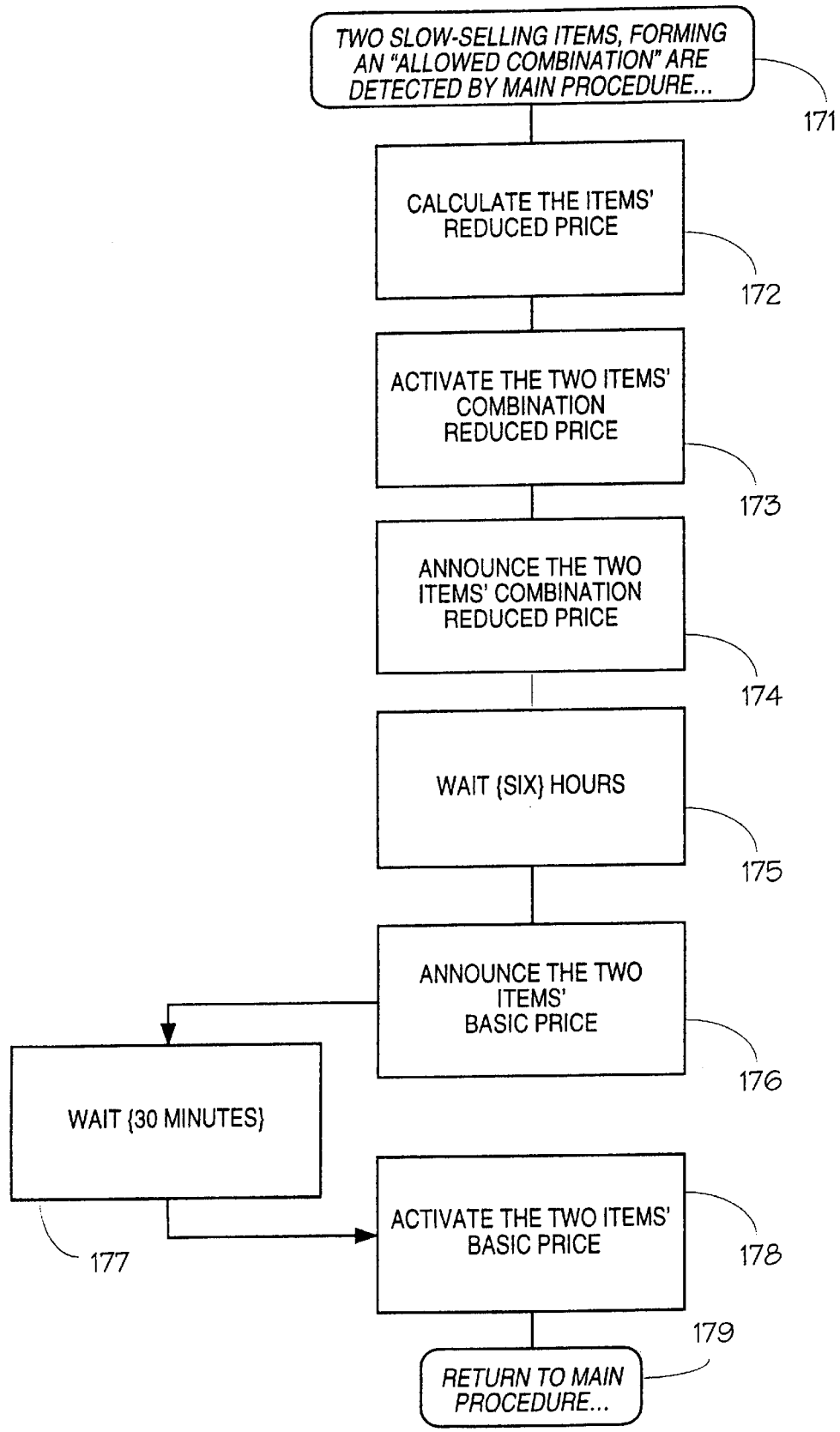
FIG. 6 is a flow chart of a sale promotion procedure for a combination of slow-selling items.

FIGS. 5 and 6 describe sales promotion of an item or item combination, when slow-selling items are detected by the Main Procedure of FIG. 3 at block 145. When a slow-selling item is detected at 161, its price is reduced according to Tables 1 and 2. The reduced price is activated at the POS unit 103 (block 163), and then the item's reduced price is announced (block 164) through the Sale announcement system. This low price is maintained (block 165) for, say, 6 hours, after which its basis price is announced (block 166). A delay of, say 30 minutes, is maintained (block 167) before the basic price is actually reactivated at the POS sensor unit 103 (block 168) to accommodate in-store customers who have picked items under the reduced price.

FIG. 6 is similar to FIG. 5, except that the sale is activated for a combination of items, which requires purchasing the entire combination in order to get the reduced price. In this example, two items, which, according to the price-reduction criteria in Tables 1 and 2 form an allowed combination, are detected as slow selling items (block 171). The prices of the items are reduced so that the profit margin is cut according to Tables 1 and 2 (block 172), but only when they are purchased together. The combination reduced price is activated at the POS sensor unit 103 (block 173) and announced (block 174) normally through the electronic signs 133 and 134 (FIG. 1B), without changing the individual electronic shelf labels 135, except for the display of an optional "COMBO" mark on the screen, which encourages the customer to look for the sale details at the signs. After waiting for, say, six hours (block 175), the basic price is announced, or the special sale announcement is cancelled (block 176). A waiting period of 30 minutes then takes place (block 177), until the basic price is reactivated (block 178) at the POS sensor unit 103. The foregoing delay is made for in-store customers who have picked up an item combination under the reduced price.

Figure 7:
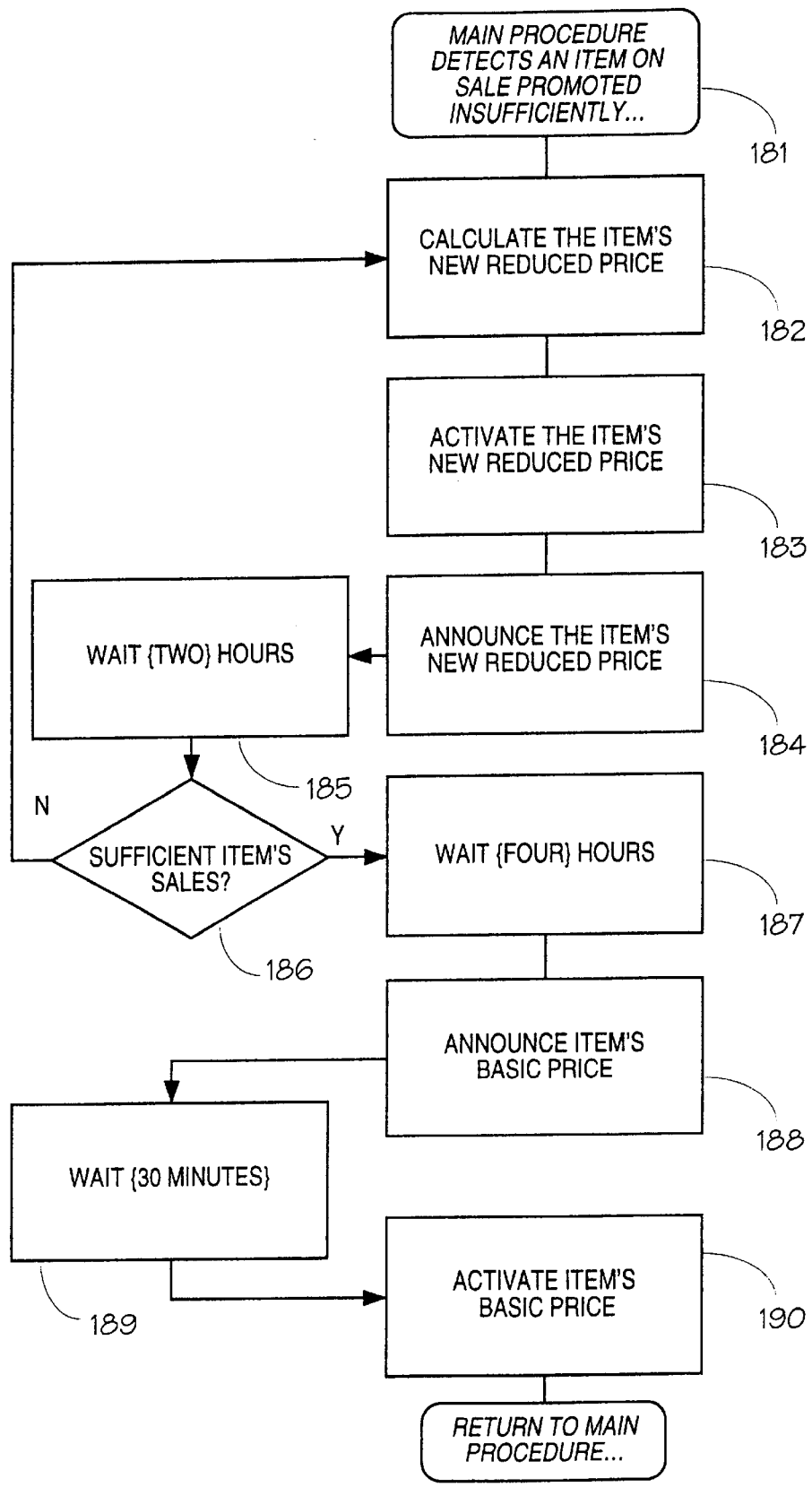
FIG. 7 is a flow chart of a sale promotion procedure with automatic price readjustment.

FIG. 7 demonstrates sales promotion with automatic readjustment where the sales increase of an item is below the expectations predefined by the price-reduction criteria 116 as detected by the main procedure of FIG. 3 at 148. When such an item is detected (block 181), the price is further reduced (block 182) by cutting the profit margin by another price reduction step as specified in Table 1. The new price is activated at the POS sensor unit 103 (block 183), followed by announcing the new price in the Sale announcement system 104 of FIG. 1A (block 184). After a delay of, say, 2 hours (block 185), the effect of the new price-reduction is checked (block 186). If the sales are still insufficient, another price-reduction iteration is initiated (block 182). Otherwise, the sale is maintained for another, say, four hours (block 187), and then the basic price is announced (block 188) and then reactivated (block 190) after a delay (block 189) made for in-store customers who have purchased items under the reduced price.

Figure 8:
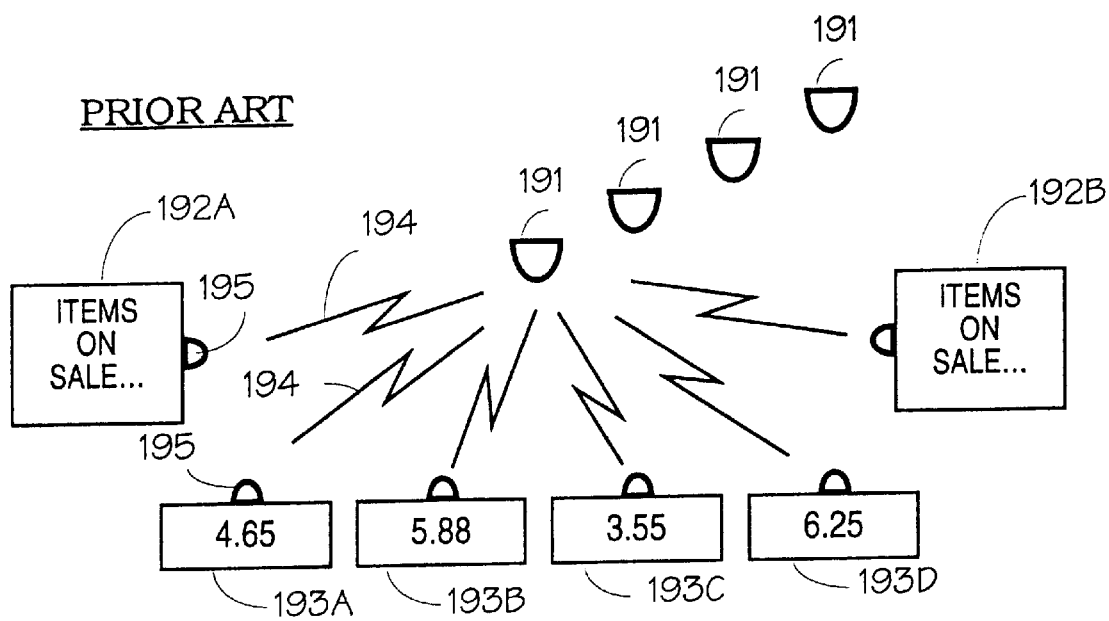
FIG. 8 schematically illustrates a typical layout of a wireless data communication system that may be used.

With reference to FIG. 8, when a large number of displays is involved in the Sale announcement system of FIG. 3, as is the case where electronic shelf labels 135 are included, wireless data communication is advantageous. A wireless data communication system, as described in detail in the cited prior art, comprises a number of transmitters 191, usually located at the store ceiling and hard-wired to the store computer system. They send messages through coded pulses 194, which are received by the receivers 195 of the electronic shelf labels 193A, 193B, 193C, 193D . . . and by the electronic in-store signs 192A, 192B. Each receiver 195 checks whether the message is addressed to it, and if so, it changes the information stored or displayed therein according to the contents of the message.

Figure 9:
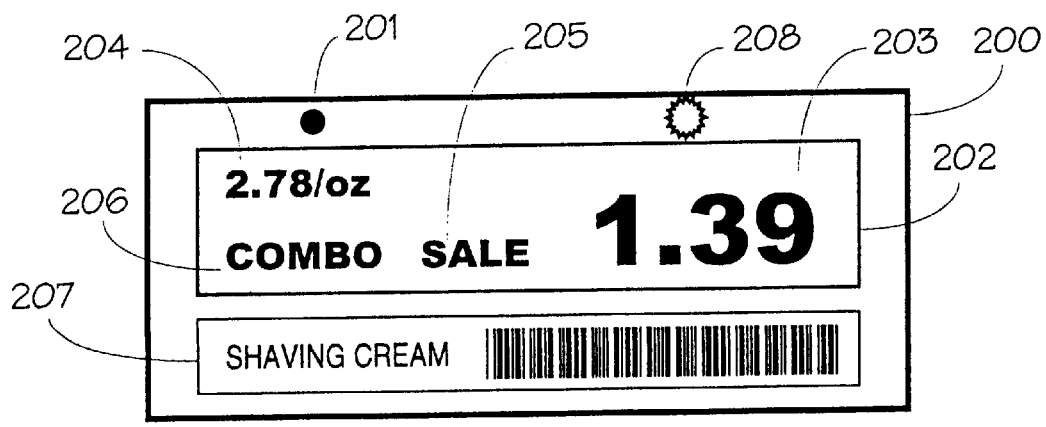
FIG. 9 illustrates a typical electronic shelf label.

FIG. 9 illustrates the front panel 200 of an electronic shelf label which is located adjacent to the respective merchandise items and operated by the wireless data communication system of FIG. 8. Wireless receiver 201 receives the messagaes addressed by coded pulses to the specific label. The information included in the message will update the product-specific information on the screen 202, such as the price 203, price-per-unit 204, and whether the product is on Sale 205 or on combo sale 206. Sticker 207 includes permanent product information, such as its description and specific bar-code. The electronic shelf label may include a blinker 208 which is actuated when the item is currently on sale, to attract customer attention and to increase the effectiveness of the sales promotion system. Logically, it is an extension of the screen 202, and instructions regarding the blinking activation, which may include also the blinking rate and blinker on/off ratio, are preferably packed with the display information addressed to the electronic shelf label.

Figure 10:
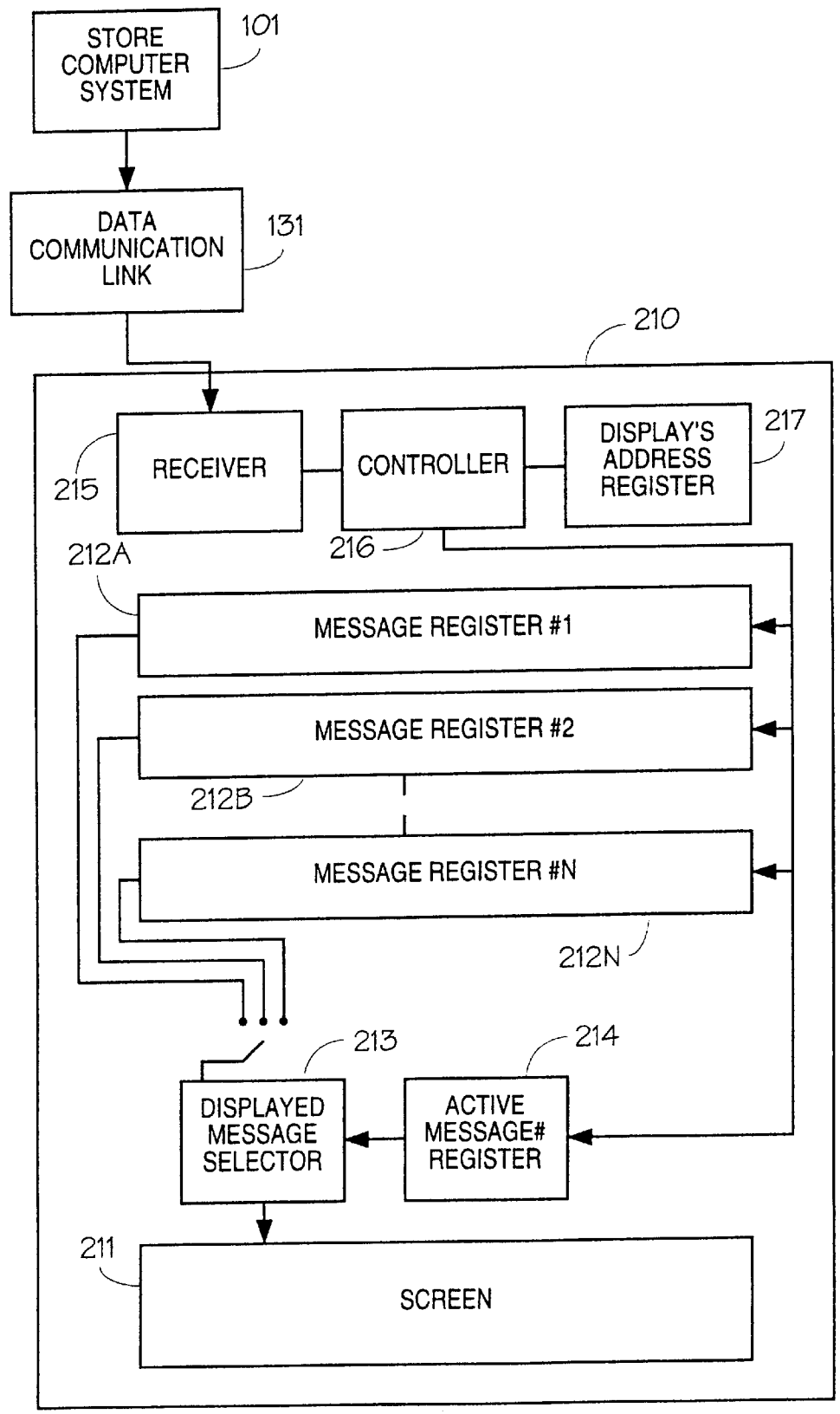
FIG. 10 is a block diagram of a multiple-register display which allows simultaneous global display changes.

If many prices are to be changed at once, as happens for example, in the global price-reduction of FIG. 4, then the actual price change in thousands of electronic shelf labels and signs would take many minutes, which may cause temporary discrepancies, for example between the prices shown on electronic signs and prices shown on electronic shelf labels. To allow for a simultaneous change of many displays, which may include both electronic shelf labels and electronic signs, a multiple-register display is proposed, as described in FIGS. 10, 10A and 10B. By using such displays, the system of the present invention may take all the time needed to prepare for an alternative price list, and then change and activate the new price list at once.

The multiple register display 210, which may be an electronic shelf label or an electronic sign, displays on the screen 211 the contents of any specific message register 212A–212N, as determined by the displayed messsage selector 213, according to the contents of active message number register 214. The messages are fed via the data communication link 131 via receiver 215 to controller 216 which matches the message address with an address register 217.

Figure 10A:
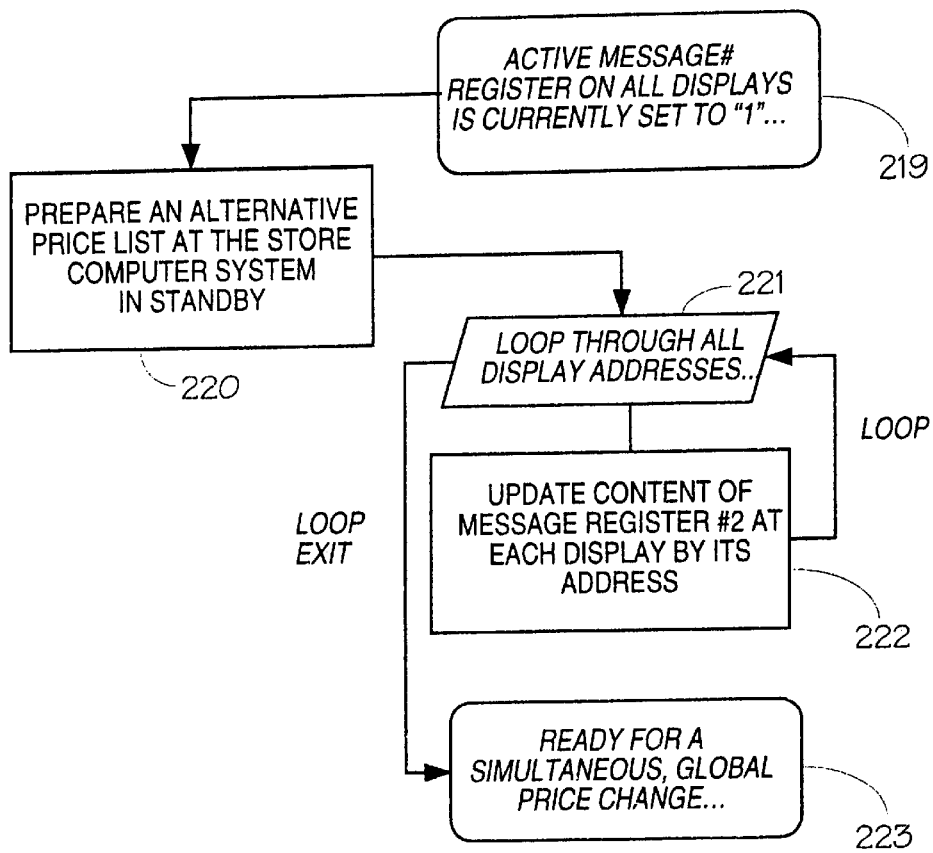
FIG. 10A is a flow chart describing the preparation of the displays of FIG. 10 for a simultaneous global price change.
Figure 10B:
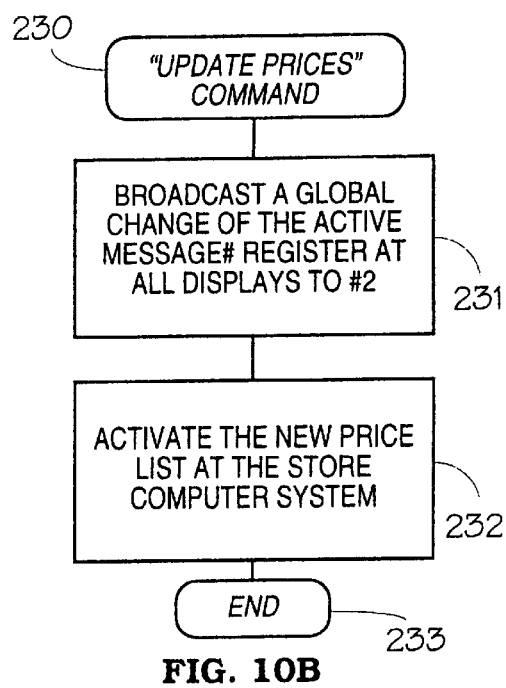
FIG. 10B is a flow chart describing the execution of a simultaneous global price change of the displays of FIG. 10.

The price change is made in two steps, as illustrated in FIGS. 10A and 10B. Initially (block 219, FIG. 10A), active message number register 214 contains the number "1". Thus the multiple register display 210 shows on its screen 211 the content of message register 212A. The store computer system 101 prepares the next price list (block 220), for example according to the procedure of FIG. 4; the alternative price list is not yet activated at the POS sensor unit 103. A series of messages, each address to a specific display 210 by an address which matches the content of its address register 217, is sent through the data communication link 131 (blocks 221, 222). Each message comprises an address, the alternative price to become effective soon, and the number "2" to denote the message register selected for the next effective message. When a display 210 receives through its receiver 215 such a messagae, its controller 216 checks whether the address in the message matches the address stored in the address register 217. If so, it changes the contents of message register 212B to specify the future price included in the received message. However, the content of the message shown on the screen 211 is still that of message register 212A, because the content of its active message number register is still "1". When all displays 210 have been updated in this way, the store computer system 101 is ready, (block 223), for a global price change.

When an "updated prices" command is received (block 230, FIG. 10B), either automatically at a predetermined hour, or under the merchant decision through the merchant interface 102 of FIG. 1, a single global command is broadcasted (block 231), to change the contents message number register 214 in all displays 210 to "2", irrespective of the display address stored in its register 214. This causes a simultaneous, global change of the contents of the information shown on the screen 211 of all displays 210. Immediately after this change, the new price list is activated (block 232) at the store computer system, to affect the prices at the POS units 103.

In some cases, special price-reduction is granted to selected customer categories, such as students, senior citizens, frequent shoppers, military personnel, etc. The discounted prices are included at the basic price information 112 of FIG. 1A, and may be also further reduced according to the price-reduction criteria 116. When a customer 110 identifies himself or herself at the POS unit 103 as belonging to an eligible category by presenting an ID verifier 240 (FIG. 11), the customer is charged the special prices.

Figure 11:
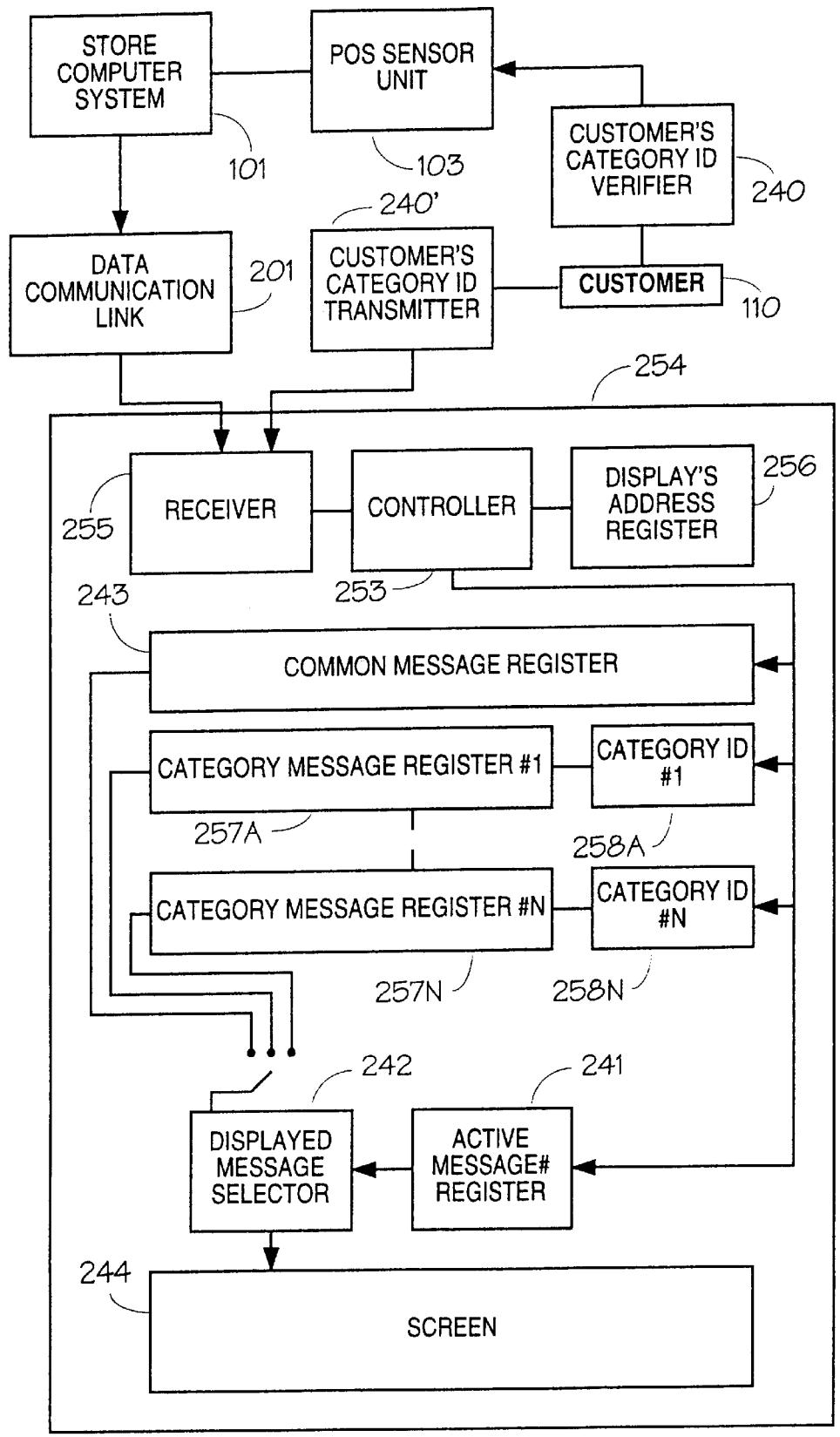
FIG. 11 is a block diagram of a system allowing the assignment of special prices to selected customer categories.

FIG. 11 illustrates a block diagram of a system which shows temporarily the message assigned to the specific customer category, instead of the standard message shown to the general public. Such a message displayed on an electronic shelf label, or on an electronic sign would be the special prices applicable the specific customer category.

Normally, the active message number register 241 includes "0", which causes the message selector 242 to display the contents of the common message register 243 to be displayed on screen 244.

Figure 11A:
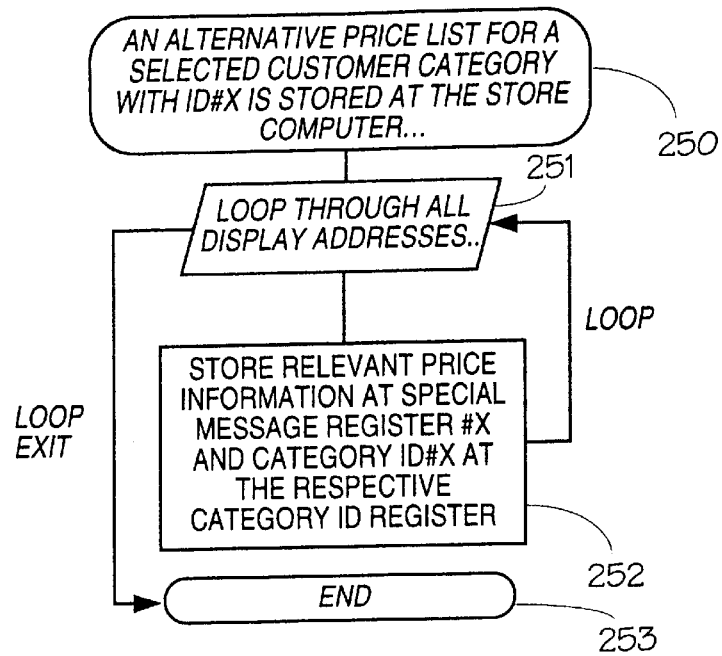
FIG. 11A is a flow chart describing the setting procedure of an alternative price list for a selected customer category in the system of FIG. 11.

FIG. 11A describes the procedure setting an alternative price list for the selected categories. After store computer system 101 assigns (block 250) special prices to a selected category, it loops (block 251) through all displays, sending (block 252) messages with the display address, the register number X, the respective category ID, and the special message assigned to the respective category at the respective display. The controller 253 (FIG. 11) of data processor 254, when receiving such a message through receiver 255, checks whether the address incorporated in the message matches the contents of address register 256, and if so, it changes the contents of a respective category message register 257A–257N, to include the category ID 258A–258N and its corresponding message, respectively.

Figure 11B:
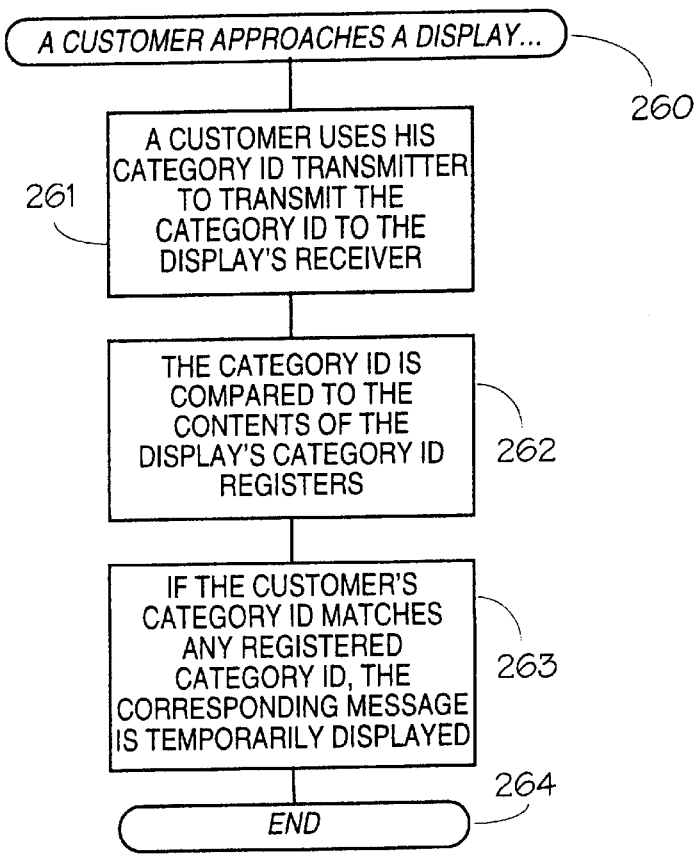
FIG. 11B is a flow chart describing the procedure in the system of FIG. 11 for displaying special price information to a member of a selected customer category.

The operation is described in FIG. 11B. When a customer approaches a display (block 260), the customer uses the category ID transmitter 240' (block 261) as shown in FIG. 11, to identify the respective category.

The category ID transmitter is a device which is capable of transmitting category ID informtion to the display's receiver 255. If a wireless data communication system is used, such as in FIGS. 8 and 9, the category ID transmitter would preferably be a portable, short range wireless transmitter, best implemented in infrared communication. The category ID transmitter 240' may also serve as the customer category ID verifier 240 at the POS sensor unit 103, or two separate units may be used.

When a category ID is received at data processor 254 through the receiver 255 (block 261, FIG. 11B), the controller 253 checks whether the received category ID matches any of the category IDs stored in category ID numbers 258A–N (block 262). If so, the controller changes temporarily the contents of the active message number register 241 to the number of each category ID number 258A–N (block 263), which causes the message selector 242 to display the contents of the respective message register 257A–N on the screen 244. This change is reversed after a predetermined period of time, or as the transmission of the category ID from transmitter 240' to receiver 255 terminates (block 264). If the category ID stored in category ID numbers 258A–N is selected to be A–N, i.e, the address of category message register 257A–N, registers 257A–N become redundant and may be omitted.

FIG. 12 illustrates one form of display unit in the form of an electronic shelf label 310 which interacts with the user in accordance with the system of FIGS. 11, 11A and 11B, to display price and other information regarding the products on the shelves. The electronic shelf label 310 includes a base member 312 carrying a display 313, e.g., an LCD (liquid crystal display), for displaying price information 313A and the category 313B of the purchasers intending to receive the displayed price information. Base member 312 includes a further display 314 displaying product information at 314A, and also a descriptive label 314B (e.g., bar-coded) describing the product involved.

Display unit 310 illustrated in FIG. 12 is interactive with portable units, as will be described more particularly below, supplied to at least one of the users (e.g., customers) of different categories, so that the display unit displays the information applicable to the respective category of user. For example, one category would be the general public who would not be supplied with a portable unit. Other categories, such as senior citizens, would be entitled to discounts according to the specific category. Such selected categories are supplied with a portable unit which includes a transmitter (preferably an infrared transmitter via space and/or contact) for transmitting a coded signal identifying the respective category of the user. Display unit 310 illustrated in FIG. 12 thus also includes a receiver, schematically shown at 315, for receiving the coded signals transmitted by the portable units in order to identify the respective category of the customer.

It will thus be seen that the changeable display illustrated in FIG. 12 is viewer-dependent; that is, it exhibits special prices according to the category of the customers interacting with the display by portable units carried at least by some of the customer catgeories.

However, there are other situations where it is also desirable to display data in a viewer-dependent manner. One example would be to display various sales information (e.g., prices, total number of units sold, etc.) to, and only to, selected management personnel. Another example is in a "pick-to-light" system, for use in warehouses wherein electrical signs with an eye-catching light are used to guide personnel in their assignments, as described for example in U.S. Pat. Nos. 3,908,800 and 4,346,453. Another example of a viewer-dependent display would be to provide routing instructions leading to a plurality of different possible destinations, wherein the display of the routing instructions changes according to the specific destination of the respective viewer as inputted by a portable unit carried by the viewer.

FIG. 13 illustrates a display unit 320 for use in a "pick-to-light" warehouse system interactive with the user to guide the user to selected items in the warehouse. Display unit 320 includes a base member 322, a display 323 in the form of a blinker which is energized to guide the user to the ultimate product in the warehouse, a display 324 provided with a description or identification of the product 324A and with its bar code label 324B, a receiver 325 for receiving the coded signals transmitted by the respective portable units.

The display unit 330 illustrated in FIG. 14 is also for use in a "pick-to-light" system. It also includes a base member 332, a display 333 in the form of an eye-catching blinker, a further display 333A in the form of an LCD screen with assignment and address information, another display 334 for displaying the description 334A and its bar code label 334B, and a receiver 335 for receiving the coded signals transmitted by the portable units and/or the central computer.

FIG. 15 illustrates a display unit 340 for use particularly in providing routing information to users in an interactive manner. Thus, the display unit 340 includes a base member 342 and data 343 to be selectively displayed according to the category of user. In the illustrated example, data 343 includes a plurality of arrows which are selectively energized to direct the user in a particular direction. Display unit 340 includes other data 344 specifying the ultimate destination of the respective user, and a receiver 345 for receiving the coded signals transmitted by the respective portable unit.

FIG. 16 illustrates one form of portable unit usable with any of the display units illustrated in FIGS. 12–15 according to the particular application of the system. Thus, the portable unit illustrated in FIG. 16, therein generally designated 350, includes identification data 351, a photo of the user 352 (if desired), a transmitter 353 for transmitting a coded signal identifying the respective category of the user, and an ON/OFF switch 354 to energize or deenergize the transmitter 353.

Transmitter 353 may be any type of space transmitter for transmitting coded signals in a wireless manner to the receiver of the respective display unit to identify the category of the user carrying the portable unit. Preferably, the transmitted signals are infrared binary code signals so as to narrowly restrict the effective range and direction of the transmissions and thereby minimize interference from other portable units and with other display units.

FIG. 17 illustrates a universal portable unit, generally designated 360, e.g., for use by a store manager to enable access to different categories of data, e.g., to the different discount prices, sales figures, etc. The universal portable unit 360 thus includes a base member 362 having a plurality of selector keys 363A, 363B, 363C, for selecting the coded signal to be transmitted via transmitter 364. In this case, it also includes a receiver 365 which may be used for remotely downloading or changing the various message codes selected by the keys 363A–363C.

Figures 18, 18A:
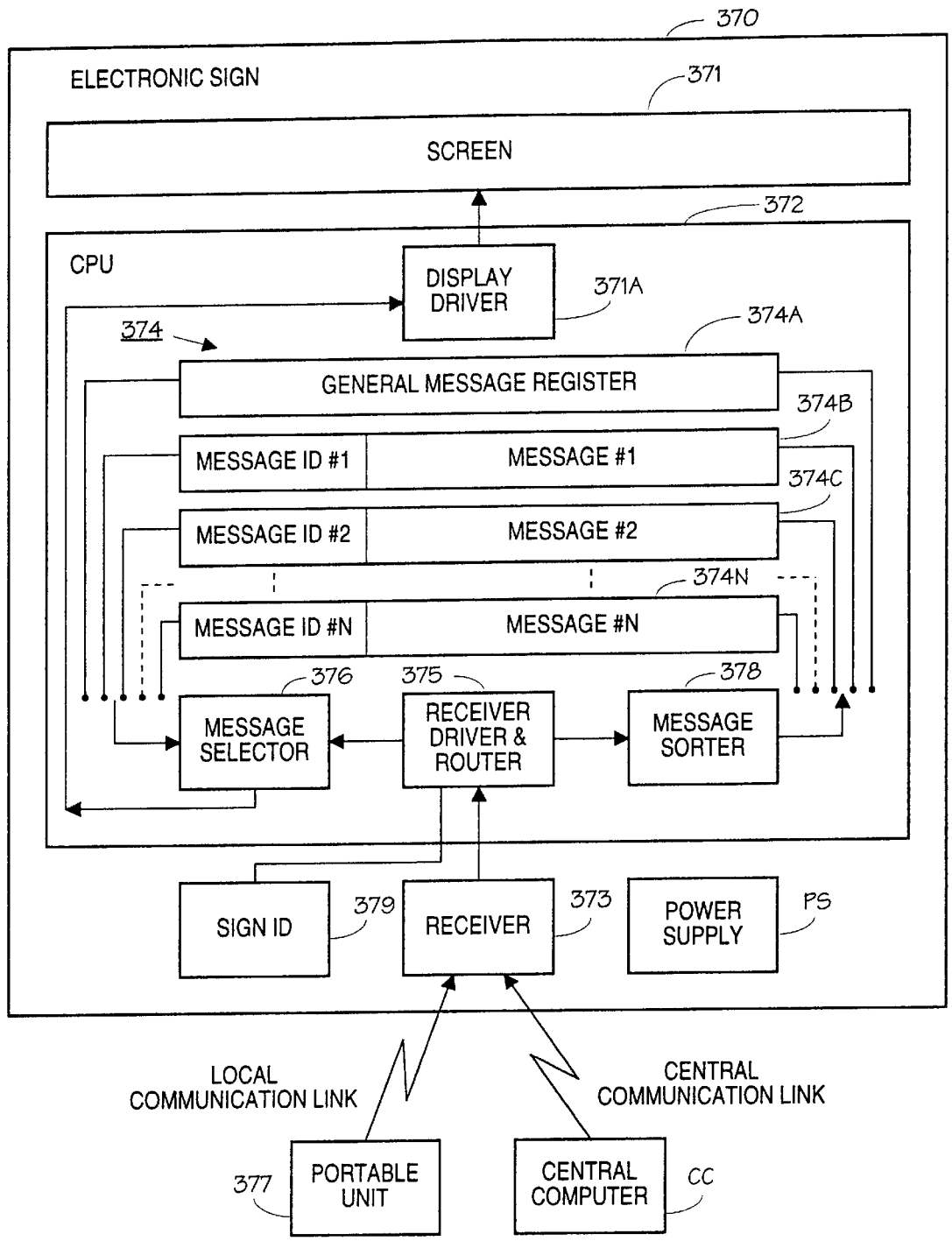
FIG. 18 is a block diagram illustrating another form of interactive changeable display system in accordance with the present invention.
FIG. 18a illustrates three examples of changeable displays that may be selected in the system of FIG. 18.

FIG. 18 illustrates one example of an overall system including a portable unit 377 (corresponding to that illustrated in FIG. 16 or 17) for transmitting a coded signal identifying the respective category of user carrying the portable unit, and a display unit 370 for displaying the data for the respective portable unit. Display unit 370 also has a central processor unit 372 which includes the receiver 373 for receiving the coded messages from the portable unit 377, and a storage device 374 for storing a plurality of display data corresponding to the different categories of users. Thus, the storage device 374 includes a general message register 374A (e.g., the normal price of a particular item), and further message registers 374B–374N, one for each different category of user. The input of receiver 373 is fed, via a receiver driver and router 375 to a message selector 376 which selects the appropriate message register corrresponding to the coded signal received from the portable unit 377, and feeds the message therein, via display driver 371A, to the changeable display 371.

Storage device 374 may be loaded with different messages via an external central computer CC also having a space transmitter for transmitting the messages to receiver 373 of the central processor unit. These messages are fed via receiver driver and router 375 and message sorter 378 to the storage device 374 for recording the messages therein.

The CPU 372 further includes a sign ID register 379, which identifies the respective display unit.

FIG. 18a illustrates examples of messages that may be stored in the message registers 374A–374N. Thus, one message $MD_1$ may be the normal price of the product (e.g., soap), a second message $MD_2$ may be the reduced price for senior citizen customers, and message display MD₃ may be the weekly sales figures accessible only to the store managers.

Figure 19:
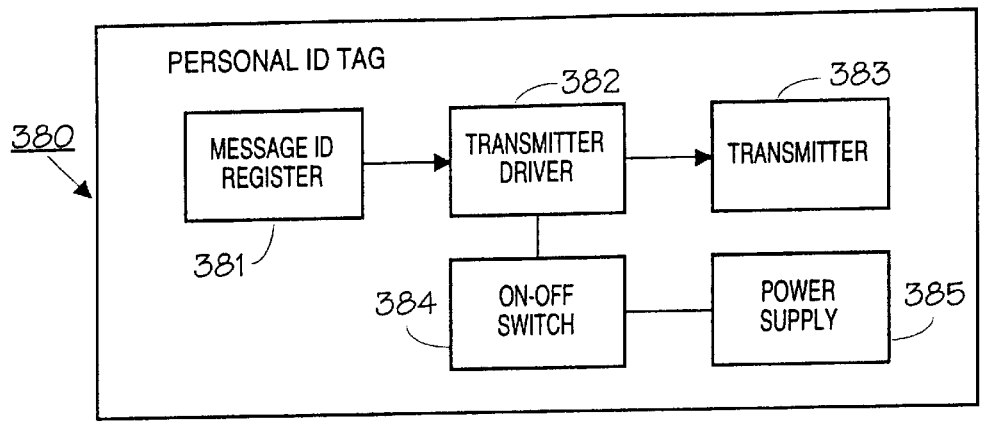
FIG. 19 is a block diagram illustrating the circuitry in a simple portable unit such as illustrated in FIG. 16.

FIG. 19 illustrates the circuitry included in a portable unit 380, e.g., one corresponding to unit 350 in FIG. 16. Portable unit 380 illustrated in FIG. 19 includes a register 381 for storing the identification of the category of persons carrying the portable unit, a driver 382 for driving the transmitter 383 which transmits the coded signal identifying the respective category of user, an ON/OFF switch 384 corresponding to switch 354 in FIG. 16 for turning-on or turning-off the unit, and a power supply 385 for supplying electrical power to the unit.

As indicated earlier, the transmitter 383 is preferably an IR (infrared) transmitter, to restrict the range and direction of transmission, and thereby to minimize interference with other portable units.

Figure 20:
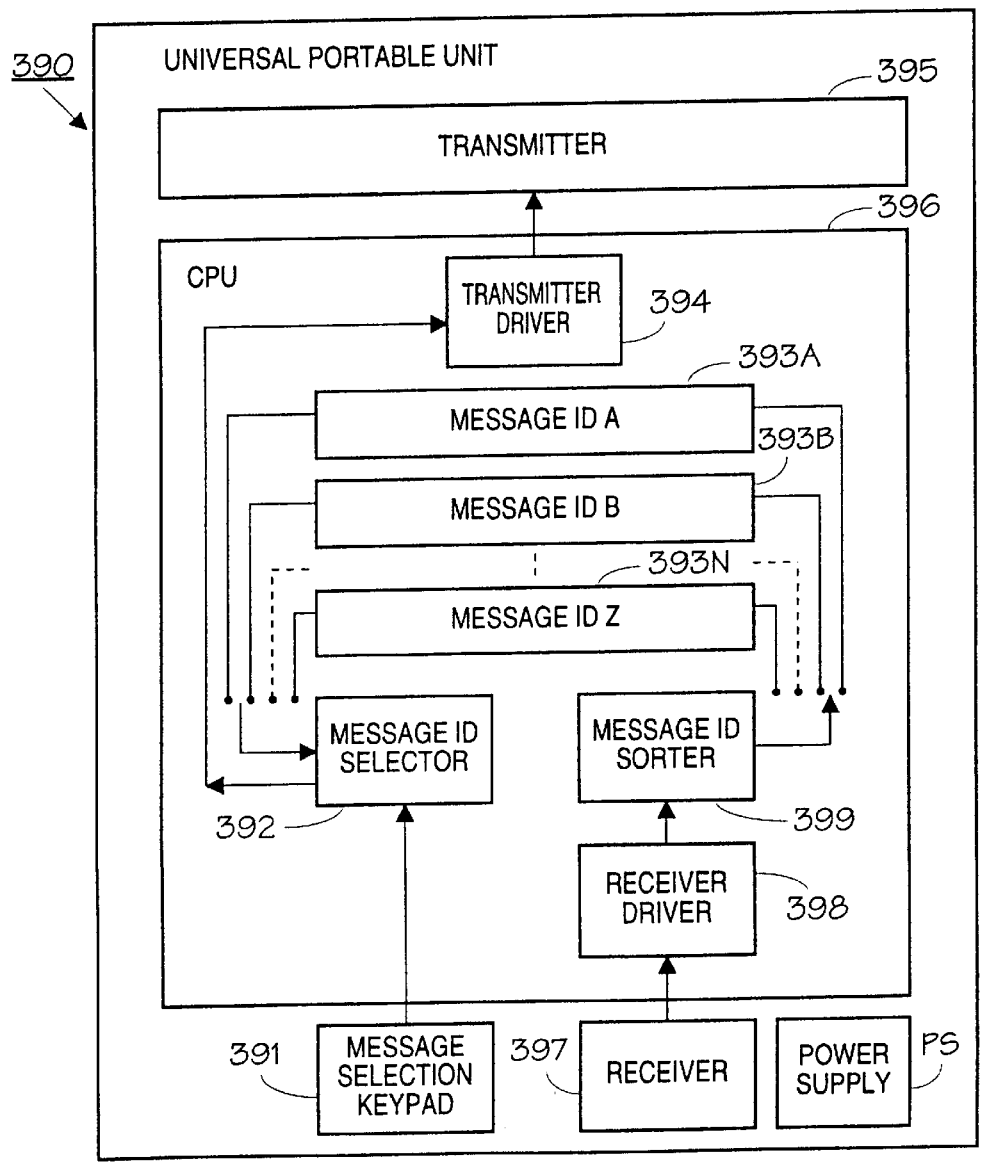
FIG. 20 is a block diagram illustrating the circuitry in a more complicated portable unit, such as illustrated in FIG. 17.

FIG. 20 illustrates the electrical circuitry included in a universal portable unit (e.g., that illustrated in FIG. 17) for use by a special category of users (e.g., storee managers) enabling such user to have access to any one of a plurality of the messages exhibited by the display unit. The universal portable unit illustrated in FIG. 20, therein designated 390, includes its own power supply PS, and a message selection keypad 391 (corresponding to keys 363A–363C in FIG. 17) which controls a message ID selector 392, to select any one of a plurality of coded signals stored in the message registers 393A–393N The selected coded signal to be transmitted is fed, via message selector 392 and transmitter driver 394, to the transmitter 395 for transmission to the respective display unit to be viewed.

As shown in FIG. 20, the message selector 392, the message registers 393A–393N, and the transmitter driver 394, are all contained within a CPU, generally designated 396. CPU 396 also includes a capability of being remotely loaded with selected codes transmitted from a central computer (corresponding to central computer CC in FIG. 18) and received by a receiver 397 (corresponding to receiver 365 in FIG. 17). The received coded signal messages are fed, via a driver 398 and sorter 399, to the respective registers 393A–393N for recording therein.

Figure 21:
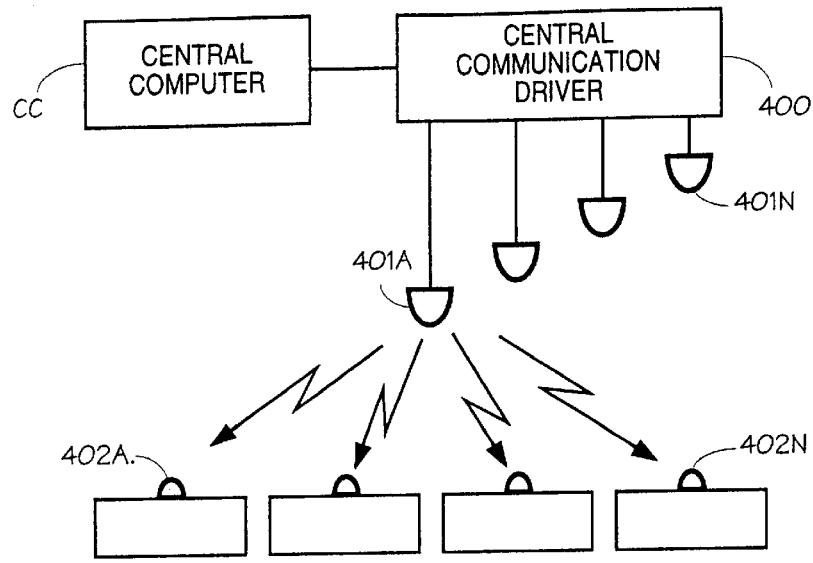
FIG. 21 schematically illustrates one manner in which a central computer can control a plurality of display units and/or portable units in a wireless manner.

FIG. 21 schematically illustrates an external central computer CC which may be used for transmitting via space the messsage codes stored in registers 393A–393N of the universal portable unit illustrated in FIG. 20, or the message codes stored in registers 374A–374N of the display unit illustrated in FIG. 18. Thus, the central computer CC controls, via a central communication driver 400, a number of space transmitters 401A–401N, each transmitting coded pulses to receivers 402A–402N. As mentioned earlier, the receivers could be carried by universal portable units, each corresponding to units 390 in FIG. 20 or 360 in FIG. 17, for loading such a unit with the various pulse codes it is capable of transmitting. Alternatively, the receivers 402A–402N could be carried by the display units, each corresponding to display unit 370 in FIG. 18, for recording the various codes in the registers 374A–374N and to be selectively displayed in the changeable display 371 of the respective unit.

Figure 22:
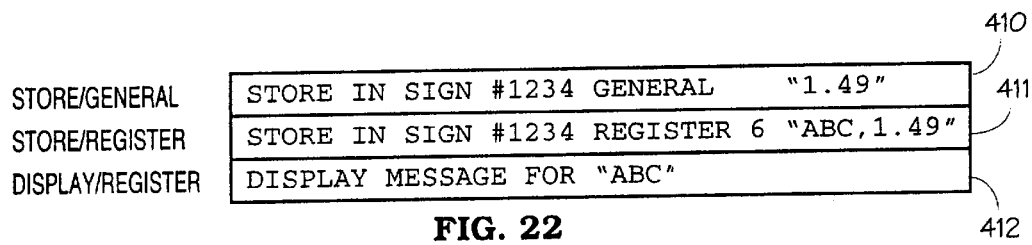
FIG. 22 is a block diagram illustrating examples of communication protocol.

FIG. 22 illustrates examples of communications protocols that may be used in the system.

The first protocol in block 410 is from the central computer CC for updating a particular display unit. This protocol is called a STORE/GENERAL protocol, since it instructs the general register (374A, FIG. 18) of display unit "1234" to enter the amount "1.49". This information is shown on the display by default whenever no transmission from a portable unit is received.

The second protocol in block 411 is also from the central computer CC for updating the display of a specified display unit. It is called a STORE/REGISTER protocol since it instructs "register 6" (e.g., of registers 374B–374N, FIG. 18) of display unit "1234" to enter for display the category "ABC" and also the amount "1.49".

Protocol 412 is one received from a portable unit. It is called a DISPLAY/REGISTER protocol, as it instructs the display unit to display whatever the portable unit tells it to display. For example, if the portable unit is one carried by category "ABC", the display unit will display both the category "ABC", and also the price for the respective category.

Figure 23:
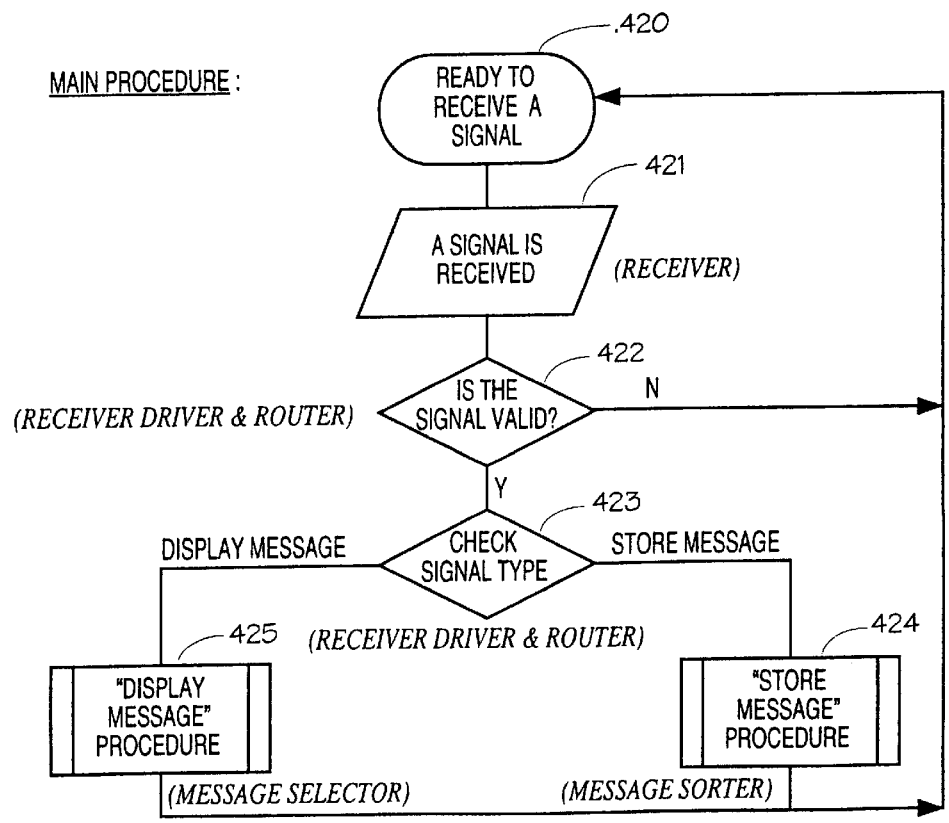
FIG. 23 is a flow chart illustrating an example of a main procedure.

FIG. 23 is a flow chart illustrating an example of a Main Procedure for storing a message in the display unit, or for having the display unit display the message stored therein. When the system is ready to receive a signal (block 420), and does receive a signal (block 421), a test is made to determine whether the signal is valid (block 422). If the signal is found valid, it is checked to determine its signal type (block 423). If it is found to be a "store message" (e.g., protocols 410 and 411, FIG. 22), the Store Message Procedure (FIG. 24) is implemented (block 424); and if the signal is found to be a "display message" (e.g., protocol 412, FIG. 22), the Display Message Procedure (FIG. 25) is implemented. The system is then returned to the Ready state (block 420).

Figure 24:
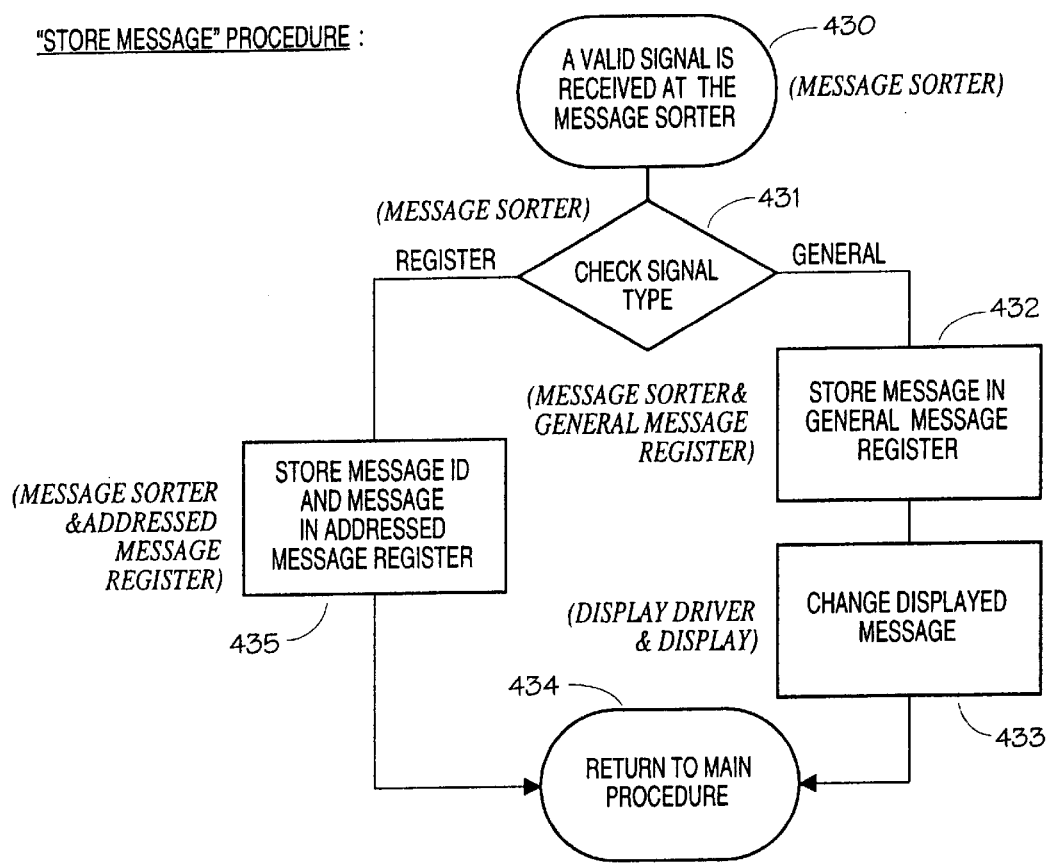
FIG. 24 is a flow chart illustrating an example of a "store message" procedure.

With respect to the Store Message Procedure illustrated in FIG. 24, when a valid signal is received at the message sorter (block 430), it is checked to determine its signal type (block 431), according to the signal protocols described above with respect to FIG. 22. Thus, if the message is intended to go to the General Register (374A, FIG. 18) of the respective display unit, it is stored in the General Message Register 374A (FIG. 18) and is used for changing the display (block 433), following which the system returns to the Main Procedure (block 434). On the other hand, if the message was intended for a specific register (374B–374N, FIG. 18), the message is directed to the specific register specified in the received signal (block 435), and the system then returns to the Main Procedure (block 434).

Figure 25:
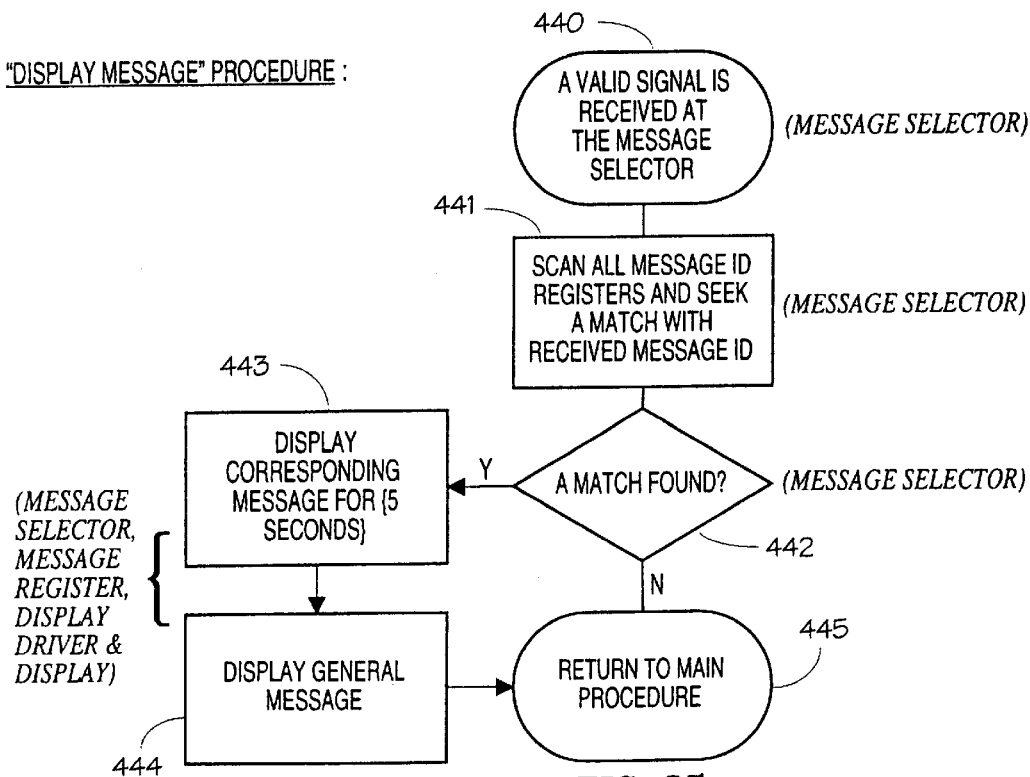
FIG. 25 is a flow chart illustrating an example of a "display message" procedure.

However, if the signal type is a "display message" (e.g., protocol 412, FIG. 22), the Display Message Procedure of FIG. 25 is followed. In this procedure, when a valid signal is received at the message selector (block 440), the message selector scans all the message registers and seeks a match with the received message (block 441). When a match is found (block 442), the viewer-specific message is displayed for a sufficient time for convenient reading (block 443), after which the general message is displayed again (block 444), following which the system returns to the Main Procedure (block 445). On the other hand, if no match is found, no displays are made and the system merely returns to the Main Procedure (block 445).

An example of a message protocol for loading a message into the universal portable unit, e.g., that shown in FIGS. 17 and 18, would be "Store WSF in Register B", which that protocol is to store the code for accessing the weekly sales figures (WSF) in register B of that portable unit.

Figure 26:
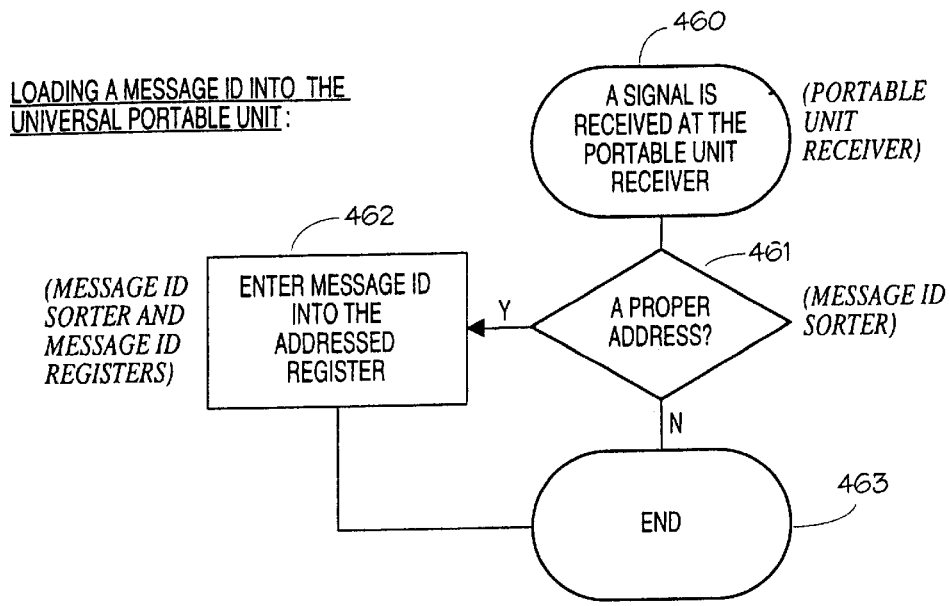
FIG. 26 is a flow chart illustrating one manner of loading a message identification into the universal portable unit.

FIG. 26 is a flow chart illustrating the loading of a message code into the universal portable unit. When the portable unit receiver receives a signal (block 460), its message sorter detemines whether that portable unit is the proper address of the message (block 461); if so, it enters the message code into the addressed register (block 462) and then ends the procedure (block 463). On the other hand, if that portable unit is not the proper address, no message is entered, but rather the system merely ends the procedure.

Figure 27:
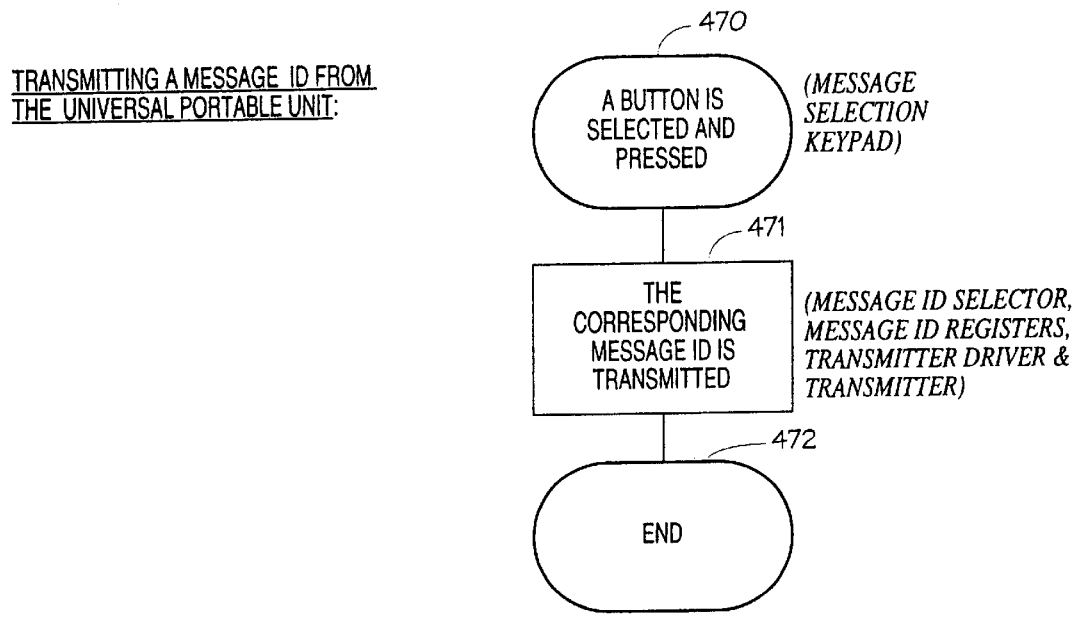
FIG. 27 is a flow chart illustrating one manner of transmitting a message from the universal portable unit.

FIG. 27 is a flow chart illustrating how the message identification is transmitted from the universal portable unit (e.g., unit 360 in FIG. 17, or 390 in FIG. 20). The selected button in the message selection keypad is depressed (block 470). The corresponding message code in the respective message register is then transmitted (block 471), whereupon the procedure is ended (block 472).

Figure 28:
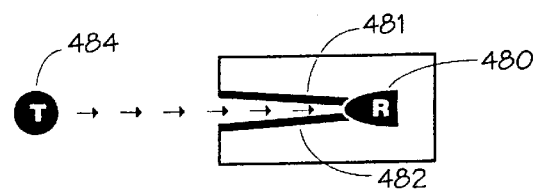
FIG. 28 is a diagram illustrating one manner of shielding the receiver of the display unit to minimize interference with other display units or from other portable units.

As mentioned earlier, it is highly desirable to shield the receiver of each display unit to minimize the possibility of interference with other display units or from other portable units, so that a selected portable unit will actuate only the addressed display unit. Thus, as shown in FIG. 28, the receiver, therein designated 480, is shielded by non-reflective walls 481, 482 converging at a shallow angle towards the receiver so as to restrict the transmitter 484 of the respective portable unit to a very narrow field-of-view of the receiver 480 of the addressed display unit. On the other hand, another part of the receiver 480, e.g., the upper part, may be completely exposed from all sides to the signals transmitted by a ceiling transmitter of the central computer (e.g., CC, FIG. 18), to enable the central computer to update all the receivers. Also, the portable unit may effect the transmission via direct contact in lieu of, or in addition to, space transmission.

We claim:

1. A data processor system particularly useful in a sales outlet for promoting sales of products, the data processor system comprising:

price storage devices for storing basic price information relating to the products;

criteria storage devices for storing predetermined criteria to be used in determining sales promotion prices of the products;

criteria input means for inputting data concerning said predetermined criteria;

a data processor for receiving data from said price storage devices, from said criteria storage devices, and from said criteria input means, and for automatically determining sales promotion prices of the products in accordance with the received data;

and electronic displays controlled by said data processor for displaying said sales promotion prices with respect to said products.

2. The system according to claim 1, wherein said criteria input means includes sensor units for sensing conditions relating to said predetermined criteria.

3. The system according to claim 2, wherein said conditions relating to said predetermined criteria sensed by said sensor units include sales volume of the respective products over a predetermined time interval.

4. The system according to claim 2, wherein said conditions relating to said predetermined criteria sensed by said sensor units include traffic volume over a predetermined time interval.

5. The system according to claim 2, wherein said conditions relating to said predetermined criteria sensed by said sensor units include current inventory status of the respective products.

6. The system according to claim 2, wherein said conditions relating to said predetermined criteria sensed by said sensor units include the category of the respective purchasers as identified by portable units carried by the respective purchasers.

7. The system according to claim 2, wherein said conditions relating to said predetermined criteria sensed by said sensor units include sales volume of the respective products over successive time intervals, and wherein said data processor automatically readjusts the sales price of a respective product after each successive time interval.

8. The system according to claim 1, wherein said electronic displays include electronic shelf labels adjacent to the displayed products.

9. The system according to claim 8, wherein said electronic shelf labels include blinkers which are selectively actuated in order to draw attention to the displayed sales promotion prices.

10. The system according to claim 1, wherein said electronic displays are controlled by a wireless link from said data processor.

11. The system according to claim 1, further including a speaker in said sales outlet, said speaker being selectively controlled to announce the sales promotion prices displayed in said electronic displays.

12. The system according to claim 1, wherein said system includes a plurality of portable units, one for at least some of the purchasers of the products, of a size to be carried by the purchaser, each portable unit including a transmitter for transmitting a coded signal identifying a category of the respective purchaser;

wherein said electronic displays, controlled by said data processor, include electronic shelf labels;

and wherein said criteria input means, for inputting predetermined criteria, includes sensor means for sensing the category of the respective purchaser as identified by the portable unit carried by the respective purchaser.

13. An interactive changeable display system for use by a plurality of users of different categories, said display system comprising:

a plurality of portable units, one for each of at least some of said users, of a size to be carried by the user, each portable unit including a transmitter for transmitting a coded signal identifying the respective category of the user;

a common display unit for a plurality of users, said display unit including a changeable display, and a receiver for receiving the coded signals transmitted by the portable units;

and a central processor unit including a storage device for storing display data corresponding to the different categories of users to use the system, and an automatic selector circuit for selecting from the stored data the display data corresponding to the coded signals received by a respective display unit and for outputting the selected display data to the changeable display of the respective display unit for display therein, said central processor unit receiving data from price storage devices, from criteria storage devices, and from criteria input means, and automatically determining sales promotion prices of products in accordance with the received data.

14. The system according to claim 13, wherein the display data stored in said central processor unit and to be displayed in said common display unit includes price information.

15. The system according to claim 14, wherein there are a plurality of said common display unit, which display units are in the form of electronic shelf labels displaying the price of various items of merchandise.

16. The system according to claim 13, wherein the display data stored in said central processor unit and to be displayed in said display units includes routing information.

17. The system according to claim 16, wherein there are a plurality of said common display unit located at different locations to display routing information to a plurality of ultimate destinations.

18. The system according to claim 13, wherein each of said portable units also includes identification information identifying the user carrying the portable unit.

19. The system according to claim 13, wherein at least one of said portable units includes a manual selector for manually selecting any one of a plurality of coded signals each identifying a different category of users, whereby the user has access to the data of a plurality of categories of users.

20. The system according to claim 13, wherein the system further comprises a central computer for controlling from a central location the plurality of display data to be stored in the central processor unit.

* * * * *